US010824948B2

(12) United States Patent
Nelson et al.

(10) Patent No.: US 10,824,948 B2
(45) Date of Patent: *Nov. 3, 2020

(54) DECISION TABLES AND FLOW ENGINE FOR BUILDING AUTOMATED FLOWS WITHIN A CLOUD BASED DEVELOPMENT PLATFORM

(71) Applicant: ServiceNow, Inc., Santa Clara, CA (US)

(72) Inventors: Harry Thomas Nelson, San Diego, CA (US); Jacob Samuel Burman, Carlsbad, CA (US); Juell Solaegui, San Diego, CA (US); Alberto Alvarado Jimenez, Santee, CA (US); Rebecca Anita Dias, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,607

(22) Filed: Dec. 21, 2018

(65) Prior Publication Data
US 2020/0092178 A1    Mar. 19, 2020

Related U.S. Application Data

(60) Provisional application No. 62/732,365, filed on Sep. 17, 2018.

(51) Int. Cl.
*G06N 5/02* (2006.01)
*G06N 5/04* (2006.01)
(Continued)

(52) U.S. Cl.
CPC ............ *G06N 5/025* (2013.01); *G06F 9/5072* (2013.01); *G06F 16/23* (2019.01); *G06F 16/908* (2019.01);
(Continued)

(58) Field of Classification Search
CPC .. G06F 9/5072; G06F 16/23; G06F 16/90332; G06F 8/10; G06F 9/485;
(Continued)

(56) References Cited

U.S. PATENT DOCUMENTS 6,609,122 B1    8/2003 Ensor
6,678,887 B1    1/2004 Hallman
(Continued)

OTHER PUBLICATIONS

European Search Report for European Patent Application No. 19197848.5 dated Dec. 12, 2019; 10 pgs.

*Primary Examiner* — Ninos Donabed
(74) *Attorney, Agent, or Firm* — Fletcher Yoder PC

(57) ABSTRACT

A trigger element of a design-time flow plan is set so that the trigger element activates in response computing conditions being satisfied. A decision action element of the design-time flow plan executed at run-time in response to activation of the trigger element is set. The decision action element is implemented by a decision table that includes decision inputs and respective condition logic based on the decision inputs for each of a plurality of decision answers associated with the decision table. The decision table is external to the design-time flow plan. First and second decision answer action elements are defined to execute at run-time respectively when a decision answer served-up by the decision table corresponds to first and second decision answer paths in the design-time flow plan that are associated with a first and second one of the plurality of decision answers, respectively. The design-time flow plan is published.

18 Claims, 24 Drawing Sheets

(51) Int. Cl.
 *G06F 16/23* (2019.01)
 *G06F 16/9032* (2019.01)
 *G06F 16/908* (2019.01)
 *G06F 9/50* (2006.01)
 *H04L 12/24* (2006.01)

(52) U.S. Cl.
 CPC ....... *G06F 16/90332* (2019.01); *G06N 5/046* (2013.01); *H04L 41/145* (2013.01); *H04L 41/5054* (2013.01)

(58) Field of Classification Search
 CPC ...... G06F 16/908; G06F 9/466; G06F 16/285; G06F 8/34; G06N 5/025; G06N 5/046; G06Q 10/063; H04L 41/145; H04L 41/5054; H04L 67/16; H04L 41/22; H04L 67/10; H04L 67/327
 See application file for complete search history.

(56) References Cited

U.S. PATENT DOCUMENTS

| | | | | |
|---|---|---|---|---|
| 7,020,706 | B2 | 3/2006 | Cates | |
| 7,028,301 | B2 | 4/2006 | Ding | |
| 7,062,683 | B2 | 6/2006 | Warpenburg | |
| 7,131,037 | B1 | 10/2006 | LeFaive | |
| 7,170,864 | B2 | 1/2007 | Matharu | |
| 7,610,512 | B2 | 10/2009 | Gerber | |
| 7,617,073 | B2 | 11/2009 | Trinon | |
| 7,636,873 | B2 | 12/2009 | Lacombe et al. | |
| 7,689,628 | B2 | 3/2010 | Garg | |
| 7,783,744 | B2 | 8/2010 | Garg | |
| 7,890,802 | B2 | 2/2011 | Gerber | |
| 7,930,396 | B2 | 4/2011 | Trinon | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,224,683 | B2 | 7/2012 | Manos | |
| 8,266,096 | B2 | 9/2012 | Navarrete | |
| 8,457,928 | B2 | 6/2013 | Dang | |
| 8,478,569 | B2 | 7/2013 | Scarpelli | |
| 8,674,992 | B2 | 3/2014 | Poston | |
| 8,689,241 | B2 | 4/2014 | Naik | |
| 8,743,121 | B2 | 6/2014 | De Peuter | |
| 8,887,133 | B2 | 11/2014 | Behnia | |
| 9,065,783 | B2 | 6/2015 | Ding | |
| 9,122,552 | B2 | 9/2015 | Whitney | |
| 9,239,857 | B2 | 1/2016 | Trinon | |
| 9,535,737 | B2 | 1/2017 | Joy | |
| 9,557,969 | B2 | 1/2017 | Sharma | |
| 9,792,387 | B2 | 10/2017 | George | |
| 10,657,292 | B2 * | 5/2020 | Trimberger | G06F 15/7867 |
| 2003/0004697 | A1 * | 1/2003 | Ferris | G06F 30/33 703/13 |
| 2003/0008684 | A1 * | 1/2003 | Ferris | H04B 1/0003 455/561 |
| 2003/0014611 | A1 * | 1/2003 | Ferris | G06F 8/20 712/35 |
| 2006/0225032 | A1 * | 10/2006 | Klerk | G06Q 10/10 717/105 |
| 2007/0255715 | A1 * | 11/2007 | Li | G06Q 10/00 |
| 2010/0199257 | A1 * | 8/2010 | Biggerstaff | G06F 8/456 717/104 |
| 2013/0104067 | A1 * | 4/2013 | Sullivan | G06F 3/04847 715/772 |
| 2013/0239126 | A1 * | 9/2013 | Sun | G06F 9/542 719/318 |
| 2015/0193512 | A1 | 7/2015 | No et al. | |
| 2017/0235848 | A1 * | 8/2017 | Van Dusen | G06F 16/904 705/12 |
| 2018/0260745 | A1 * | 9/2018 | Jana | G06Q 10/0631 |
| 2019/0188419 | A1 * | 6/2019 | Trimberger | G06F 15/7867 |

* cited by examiner

FIG. 12

DECISION TABLES AND FLOW ENGINE FOR BUILDING AUTOMATED FLOWS WITHIN A CLOUD BASED DEVELOPMENT PLATFORM

CROSS-REFERENCE TO RELATED APPLICATIONS

This application claims priority to U.S. Provisional Patent Application Ser. No. 62/732,365 filed Sep. 17, 2018, and entitled "Decision Tables," the contents of which are incorporated herein by reference.

TECHNICAL FIELD

Embodiments described herein generally relate to cloud computing and more specifically, to creating and executing flow plans and enterprise rules that act as consumers of decision tables within a cloud based developmental platform.

BACKGROUND

Cloud computing relates to sharing of computing resources that are generally accessed via the Internet. Cloud computing infrastructure allows users to access a shared pool of computing resources, such as servers, storage devices, networks, applications, and/or other computing-based services. By doing so, users, such as individuals and/or enterprises, can access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and application platform as a service (aPaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. Further, aPaaS acts as an extension of SaaS that goes beyond providing software services by offering customizability and expandability features to meet a user's needs. For example, aPaaS can provide a cloud-based developmental platform for users to develop, modify, and/or customize applications and/or automate enterprise operations without maintaining network infrastructure and/or allocating computing resources normally associated with these functions. Within the context of automating enterprise, IT, and/or other organization-related functions (e.g., human resources (HR)), an aPaaS platform often provides users an array of tools to implement complex behaviors, such as enterprise rules, scheduled jobs, events, and scripts, to build automated processes and to integrate with third party systems.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: setting a trigger element of a design-time flow plan so that the trigger element activates in response to one or more predetermined computing conditions being satisfied; setting a plurality of action elements of the design-time flow plan, the plurality of action elements executing at run-time in response to activation of the trigger element, wherein at least one of the plurality of action elements is a decision action element implemented by a decision table that includes decision inputs and respective condition logic based on the decision inputs for each of a plurality of decision answers associated with the decision table, wherein the decision table is external to and decoupled from the design-time flow plan; defining a first one of the plurality of action elements of the design-time flow plan as a first decision answer action element that is executed at run-time when a decision answer served-up by the decision table corresponds to a first decision answer path in the design-time flow plan that is associated with a first one of the plurality of decision answers; defining a second one of the plurality of action elements of the design-time flow plan as a second decision answer action element that is executed at run-time when the decision answer served-up by the decision table corresponds to a second decision answer path in the design-time flow plan that is associated with a second one of the plurality of decision answers; and publishing the design-time flow plan.

In another embodiment, the method may be embodied in computer executable program code and stored in a non-transitory storage device. In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 12 illustrates an embodiment where a field value of a trigger record is updated based on a decision answer by running an enterprise rule (or flow plan) that acts as a consumer of a decision table.

DESCRIPTION OF EMBODIMENTS

Figure 1:
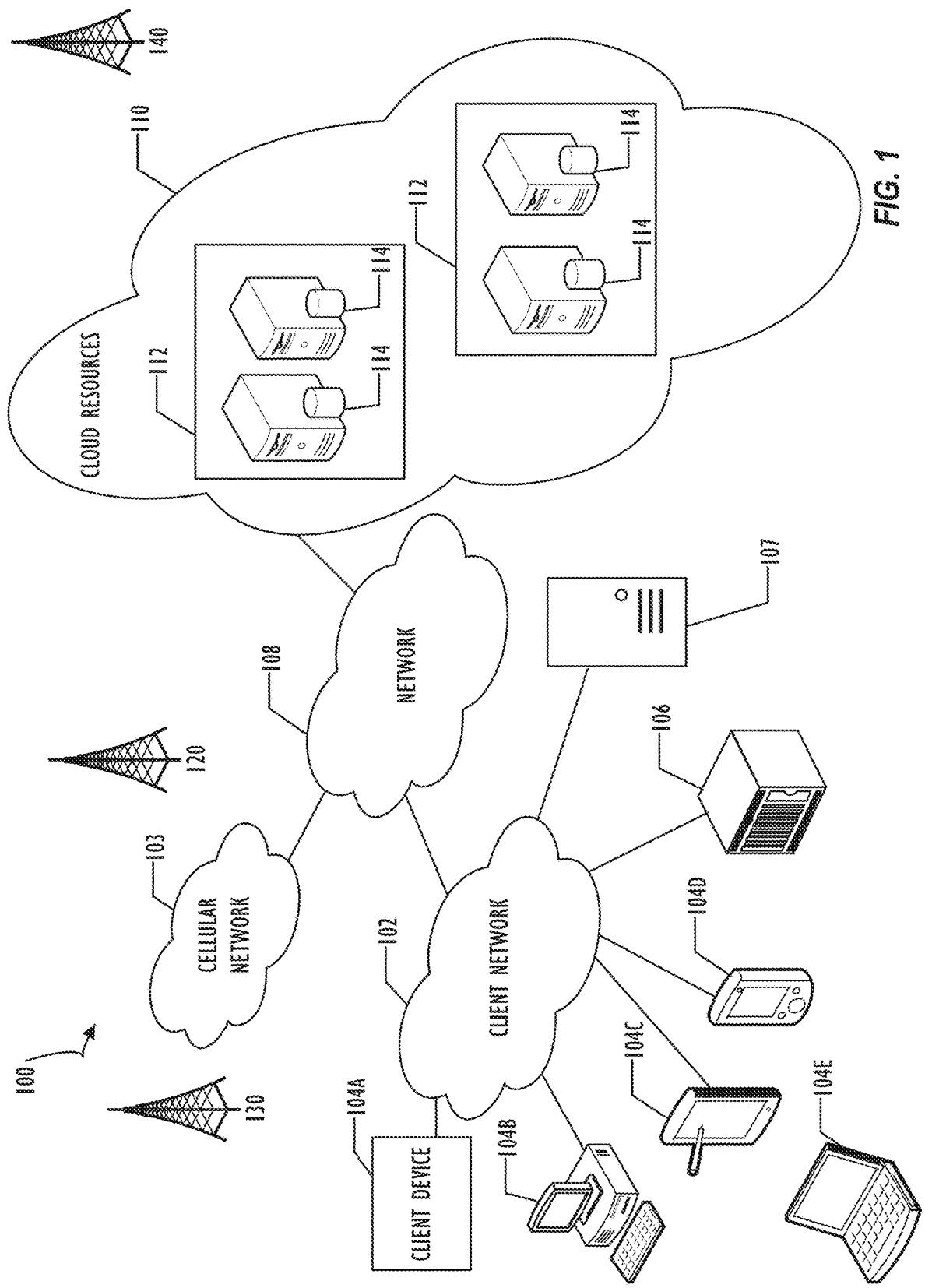
FIG. 1 is a schematic diagram of an embodiment of a cloud computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "flow plan" refers to a configured, automated process for addressing one or more tasks. In one or more embodiments, the tasks (e.g., action elements) for the flow plan correspond to a variety of enterprise and/or other organization-relation functions. Categories of tasks that relate to enterprise and/or other organization functions include, but are not limited to HR operations, customer service, security protection, enterprise applications, IT management, and/or IT operation. In one embodiment, flow plans are created on a flow plan development platform, such as a Web 2.0 development platform written in Java® (JAVA is a registered trademark owned by Oracle America, Inc.).

As used herein, the term "global state" refers to one or more global parameters or global variables that are accessible for an entire application. Examples of parameters or variables for a global state include, but are not limited to, process and task execution statuses and resource conditions. In one embodiment, a centralized decision-making component, such as a centralized controller, is able to track the global state and determine execution orders for operations within a workflow.

To further simplify the process for a user to design and run automated processes for various enterprise, IT, and/or other organization-related functions, and to address abstraction (e.g., providing domain-appropriate building blocks), code reuse (e.g., having defined application program interface (API) semantics), and/or codeless development, an aPaaS platform may provide additional tools allowing designers to perform low code/no code development in a natural language authoring environment. The low code/no code, natural language process automation may enable users with little or no custom scripting knowledge to be able to design and run automated processes. In the context of implementing complex behaviors using automated processes on the aPaaS platform, it may be desirable to decouple policy logic of the automated process that may normally be determined by users acting as enterprise stakeholders or decision makers, from process logic or coding of the automated process that may normally be handled by users acting as process developers.

This disclosure pertains to implementing decision tables for consumption by automated processes in an aPaaS environment. Techniques disclosed herein look to create a data model with an application programming interface (API) for re-usable condition logic that can be utilized in other parts of a cloud computing (e.g., aPaaS) environment (e.g., in flow plans, enterprise rules, and the like). The decision table may be created on a user interface as a construct that includes condition logic defined using a condition builder to specify one or more combinations of conditions based on values for decision inputs (e.g., values of form fields, or columns in one or more tables), and decision answers corresponding to the condition logic. An answer table may be associated with the decision table to store the decision answers that respectively correspond to the condition logic defined by the decision table. Decision inputs for the decision table may correspond to predetermined types of values that are to be input to the decision table in order for the condition logic of the decision table to calculate a decision answer. One or more APIs may be provided for the decision table to calculate and return the decision answer based on given values for the decision inputs. Each decision answer defined in the answer table may be a simple (e.g., direct) answer like a text string, integer or alphanumeric value, and the like. Alternately, the decision answer may be a reference (e.g., link or path) to an application object in another part of the aPaaS platform. That is, the decision answers, one of which may be selectively returned at run-time based on the calculation by the decision table, may be references to a series of application objects (e.g., series of workflow objects, series of template objects, series of case objects, series of project objects, series of record objects, and the like) defined by a series of records in one or more tables and associated metadata. The application objects may be located anywhere on the aPaaS platform. By setting a field value of a triggering record to a path that references a particular application object based on the returned decision answer, the triggering record can be linked to another rich application object, thereby coupling (and allowing access from) the triggering record in a table to any other record (and corresponding field or column values and associated metadata) in any other table in the aPaaS environment.

The decision table can be consumed (e.g., utilized or implemented) by a variety of consumers within the aPaaS environment. As used herein, the term "consumer" refers to an automated process within the aPaaS environment (e.g., a flow plan, enterprise rule, enterprise logic, script includes, scheduled job and the like) for addressing one or more tasks by implementing one or more decision tables which are decoupled from the automated process. For example, the decision table may be implemented in the automated process by calling one or more APIs of the decision table. In one or more embodiments, the tasks (e.g., action elements) for the automated process correspond to a variety of enterprise and/or other organization-relation functions. In one embodiment, a natural language process automation platform (e.g., flow designer) within the aPaaS environment can consume the decision table to create, modify, manage, and execute flow plans in which respective different flow paths can be defined during design-time for respective different decision answers corresponding to the decision table. Respective different decision action elements (e.g., computing actions) can then be defined for the respective different flow paths of the design-time flow plan. A trigger element corresponding to the flow plan can first be defined to trigger execution or activation of the flow plan when one or more predetermined computing conditions are met (e.g., create, read, update or delete (CRUD) operation for a record in a particular table on top of which the flow plan is triggered, one or more filter conditions satisfied for the CRUD record on the particular table, timer expiration, inbound API call, and the like). Once the trigger element condition(s) is satisfied, one or more action elements defined in the flow plan may be executed. One of the action elements may be a decision action element that acts as an integration point with a decision table of the aPaaS platform. Based on the selected decision table as the decision action element of the flow plan (during design-time), respective one or more action elements (decision answer action elements) may be defined during design-time for respective decision action flow paths of the decision answers corresponding to the decision table. Corresponding unique action elements can then be performed at run-time when the flow plan is triggered. That is, when the trigger element is activated and the flow plan is triggered, values based on a trigger record may be passed to the API of the decision table consumed by the flow plan. The decision table may calculate a decision answer from among the plurality of associated decision answers based on the passed values for the decision inputs and return the decision answer to the flow plan. Based on the decision answer returned by the decision table to the flow plan, the corresponding set of decision action elements of the corresponding decision action flow path may be executed by the flow plan.

To create, modify, manage, and execute flow plans, the aPaaS environment includes a flow designer system that constructs design-time flow plans and a flow engine that executes run-time versions of the design-time flow plans. The flow designer system includes a flow plan designer user interface that presents to a user, one or more action elements (e.g., decision action element) and trigger elements for constructing the design-time flow plan, an action designer user interface that allows a user to construct action elements out of action steps, and a web service API (e.g., Representational State Transfer (REST) API) to interface with a data model. The flow plan designer user interface, the action designer user interface, and the web service API drive the data model so that the design-time flow plan can be continuously updated and/or saved. Once the flow designer system receives instructions to publish the flow plan, the flow designer system may call a flow builder API to generate a run-time version of the design-time flow plan based on the data model. Afterwards, a flow engine may execute the run-time flow plan without utilizing a global state to manage flow execution order. Instead, the flow engine may execute each operation within the run-time flow plan when it is ready to run and repopulates a queue as operations are executed until there are no remaining ready operations. An operation within the run-time flow plan may be ready to run when the operation's input values are ready and the flow engine has completed any predecessor operations.

In another embodiment, an enterprise rule (e.g., enterprise logic, script includes, scheduled job, and the like) may act as the consumer of a decision table to automatically execute predetermined corresponding one or more action elements based on a decision answer returned or output by the decision table based on given passed values for the decision inputs. The enterprise rule may be a server-side script that is configured to run on the aPaaS environment and that gets triggered when one or more predetermined conditions (e.g., computing conditions, or trigger element) are satisfied. For example, the enterprise rule may be triggered when a record is created, read, updated, or deleted on a particular table on top of which the enterprise rule is programmed to run, and/or when the particular table is queried, and/or when predetermined filter conditions for the particular table are satisfied, a timer expires, or an inbound REST API call arrives. The enterprise rule may define an action element that consumes the decision table, and for example, automatically populate a value in a form field corresponding to the record that triggered the enterprise rule, based on a decision answer returned by the decision table. In case where the decision answers of the consumed decision table are references to a series of application objects (e.g., series of records on one or more tables and respective associated metadata) on the aPaaS platform, when the enterprise rule executes, the form field may be updated to reference one of the series of application objects located anywhere on the aPaaS platform, based on the decision answer returned by or obtained from the decision table. The form field can thus act to link a record in a table (that activated the trigger element of the enterprise rule) to another record in another table (e.g., any application object) and associated metadata in another part of the aPaaS platform, based on the decision answer.

Since the decision table is decoupled from a consumer of the decision table, changes made to the decision table may automatically be propagated to the process logic of the consumer without having to modify, update, re-author or re-publish the consumer, or otherwise make any changes to the consumer's configuration. For example, respective condition logic for arriving at one or more of the decision answers associated with the decision table may be updated (e.g., additional conditions added (based on existing or additional decision inputs), conditions modified, deleted, and the like) without having to change the process logic of the consumer that performs respective predetermined actions based on the served-up decision answer. For example, in the flow plan use case, a flow designer creates a flow plan and consumes the decision table to decide what actions to execute for what flow paths. At a later date, a user with only the "decision table" role can modify the decision table (e.g., change or update the policy logic) without requiring re-authoring of the flow. The decision table may also be modified to add additional decision answers (and corresponding condition logic) or remove existing ones. In this case, process logic of the consumer (e.g., enterprise rule, flow plan, enterprise logic, script includes, scheduled job, and the like) may also be modified, updated, re-authored, or re-published to consume the additional decision answer of the decision table (e.g., by specifying one or more actions for the flow path corresponding to the additional decision answer) or to remove action elements corresponding to a removed decision answer.

By decoupling process logic of the consumer consuming a decision table from the underlying policy logic or condition logic that drives the decision table, operations that may normally be performed by users acting as enterprise stakeholders or decision makers, who may have little or no programming knowledge and who may be tasked with making enterprise product or service related decisions, may be separated from operations performed by users acting as process developers or coders that drive process automation based on decisions made by the enterprise stakeholders. Thus, re-usable condition logic in the form of decision tables may be provided to users with programming knowledge but without policy knowledge. The process developers may then develop sophisticated automated processes on top of the policy logic, regardless of enterprise policy. As a result, operations performed by users in various roles in the enterprise may be more streamlined, and areas of responsibilities separated and more independently managed, resulting in increased overall efficiency.

FIG. 1 illustrates a block diagram of an embodiment of cloud computing infrastructure 100 where one or more embodiments of the present disclosure may operate. Cloud computing infrastructure 100 comprises client network 102, network 108, and cloud resources platform/network 110. In one embodiment, client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102. FIG. 1 also illustrates that client network 102 may be connected to a computer configured to execute management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 further illustrates that client network 102 is coupled to network 108. Network 108 may include one or more computing networks, such as other LANs, wide area networks (WANs), the Internet, and/or other remote networks, to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., cloud network; aPaaS platform/network; aPaaS environment) that can communicate with client devices 104A-E via client network 102 and network 108. The cloud resources platform/network 110 (e.g., aPaaS platform) acts as a platform that provides additional computing resources to client devices 104A-E and/or client network 102. For example, by utilizing the cloud resources platform/network 110, users of client devices 104A-E may be able to build and execute applications, such as automated processes for various enterprise, IT, field service and/or other organization-related functions. In one embodiment, cloud resources platform/network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance (e.g., customer instance) is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

In one embodiment, the client instance includes an aPaaS platform (e.g., cloud-based platform) that creates, modifies, manages, and executes flow plans, enterprise rules (e.g., enterprise logic, script includes, scheduled jobs, and the like), and decision tables. The aPaaS platform can include a flow plan creation component, flow plan execution component, enterprise rule creation component, enterprise rule execution component, decision table creation component, and decision table execution component. Prior to executing a flow plan, the aPaaS platform can create flow plans using a flow designer system of a flow plan development platform.

Figure 14:
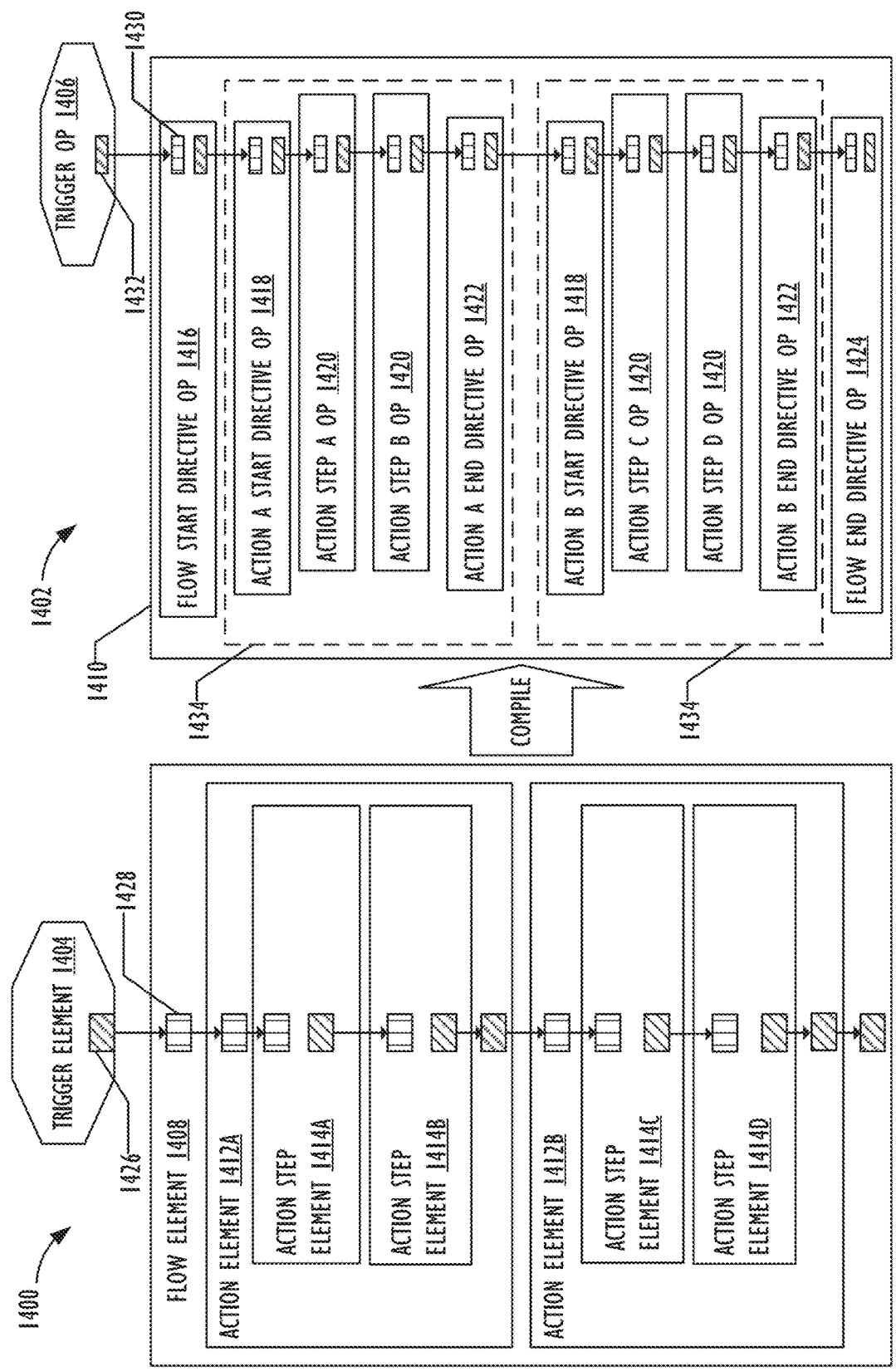
FIG. 14 is an illustration that maps the relationship between a design-time flow plan and a run-time flow plan.

As used herein, the term "design-time flow plan" refers to a flow plan during the creation phase and prior to being converted (e.g. compiled) by a flow plan builder. In one embodiment, the design-time flow plan contains one or more trigger elements, and action elements. A trigger element refers to something that initiates or activates when a certain condition or event is met (e.g., a record matching a filter is changed or created, a timer expires, and an inbound REST API call arrives). An action element (e.g., decision action element, decision answer action element, default decision answer action element) refers to a sequence of action steps that processes some defined set of input values to generate a defined set of output values. Multiple action elements can be linked together and along with the trigger elements can form the design-time flow plan. When the action element acts as an integration point for a decision table (e.g, decision action element), multiple flow paths for the multiple decision answers and corresponding decision answer action elements can be linked to form the design-time flow plan that consumes the decision table. During the flow plan execution phase, the flow plan development platform may execute a run-time version of the design-time flow plan using one or more flow engines. As used herein, the term "run-time flow plan" refers to a flow plan during the execution phase and after being converted (e.g., compiled) by a flow plan builder. In one embodiment, the run-time flow plan can be implemented as Java® Script Object Notation (JSON) document that includes a plurality of definitions. FIG. 14, which is discussed in detail below, illustrates an example of a design-time flow plan and a run-time flow plan.

In reference to the flow plan creation phase, in one embodiment, the flow designer system of the flow plan development platform includes a flow plan designer user interface, an action designer user interface, and web service API that drives a data model that represents the design-time flow plan. A user may use the flow designer system to create new design-time flow plans and/or make updates to an already existing design-time flow plan. The new design-time flow plans and/or changes made to existing design-time flow plans are stored as data models within aPaaS platform/ network 110. When a user is satisfied with the created and/or updated design-time flow plan, the user will subsequently publish the design-time flow plan. During publication of the design-time flow plan, a flow plan builder API coverts (e.g., compiles) the stored data model and generates a run-time flow plan that the development platform's flow engine executes.

Referring to the flow plan execution phase, in one embodiment, the development platform's flow engine executes run-time flow plans that are directed to acyclic graphs of operations that move data between operation nodes in a declarative manner as each operation completes. Each operation node in the run-time flow plan may have data signatures defining input and output values. Input values may be fixed values (e.g., hard coded to specific values), registered as an observer of a previous operation node, left unassigned, or a combination thereof. Operation nodes may also be registered as a descendent of a previous node A flow engine executes an operation node once the operation node's input values have been supplied and once, if any, of the operation node's ancestor operation nodes have completed successfully. In one embodiment, operations can be written in Java® by extending a base operation class, where the contract is to implement a run method and declare data signatures. The flow engine can opaquely execute the operations within the flow plan and propagate data values based on the execution of the operations. Operations can also be synchronous by design and can be configured to execute in a single and/or multiple threads.

Additionally, a computing device associated with client network 102, such as a MID server 107, can execute at least a portion of the run-time flow plan. In this embodiment, the flow plan development platform includes a second flow engine located on the MID server 107. The flow plan development platform may be able to offload the execution of the run-time flow plan to MID server 107 in situations where the client instance is unable to perform certain operations within the flow plan and/or would require too much computational resources. For example, the flow plan development platform may offload portions of the flow plan to MID server 107 in order to obtain data and/or transfer data to other server instances 112 that the client instance does not have permission to access. Utilizing a flow engine on a MID server is described in more detail with reference to FIG. 13.

Prior to executing an enterprise rule, the aPaaS platform can create enterprise rules that consume decision tables using an enterprise rule engine. The enterprise rule may be a server-side script or logic that runs when a record is displayed, inserted, updated, or deleted, or when a table is queried, or when predetermined filter conditions are satisfied. Similar to a flow plan created and executed by the flow designer system of the flow plan development platform, the enterprise rule consuming a decision table may include one or more trigger elements, and action elements (e.g., decision action elements) that are to be executed when the predetermined computing conditions of the trigger element are satisfied and the trigger element of the enterprise rule is activated. During the enterprise rule execution phase, when the enterprise rule consumes a decision table, and when one or more conditions associated with the trigger element of the enterprise rule are satisfied, the enterprise rule engine may execute one or more decision answer action elements associated with a decision answer that is returned by the consumed decision table.

In reference to the enterprise rule creation phase, in one embodiment, the enterprise rule engine includes an enterprise rule creation user interface and a web services API (e.g., REST API) that drives creation of a data model that represents the enterprise rule. A user may use the enterprise rule creation user interface to create a new enterprise rule and/or make updates to an already existing enterprise rule. The new enterprise rule and/or changes made to existing enterprise rules that consume a decision table are stored as data models within aPaaS platform network 110. When a user is satisfied with the created and/or updated enterprise rule, the user will subsequently save the enterprise rule. Upon saving the enterprise rule, the data model is created and is used by server-side APIs to generate server-side logic or script to take actions when trigger elements defined by the enterprise rule are satisfied and activated.

Referring to the enterprise rule execution phase, in one embodiment, server-side APIs execute server-side logic when predetermined trigger conditions of the enterprise rule are met (e.g., database records are queried, updated, inserted, or deleted) and trigger element activated. Server-side APIs of the enterprise rule engine may cause the enterprise rules to respond to database interactions regardless of access method: for example, users interacting with records through forms or lists, web services, or data imports. The server-side APIs of the enterprise rule engine also cause the enterprise rules to not monitor forms or form fields but execute their logic when forms interact with the database such as when a record is saved, updated, or submitted. In one embodiment, the enterprise rule action elements may be configured to set field values, add a message to a form, abort the enterprise rule execution, and the like. That is, the enterprise rule action elements may include operations with an external application (e.g., send a Slack message), operations with an internal application (e.g., update log, send email, and the like), and operations with a database (e.g., update a record in a table).

Before a decision table can be implemented or consumed, the aPaaS platform may create the decision table that provides re-usable condition logic for use in other parts of the aPaaS platform. In reference to the decision table creation phase, in one embodiment, the aPaaS platform includes a decision table module that includes a decision table creation user interface and a data model that drives creation of a data model that represents the decision table. A user may use the decision table creation user interface to create a new decision table and/or make changes to an existing decision table (e.g, update condition logic, add/remove/update decision inputs, add/remove/update decision answers, and the like). The new decision tables and/or changes made to existing decision tables are stored as data models within aPaaS platform network 110. When a user is satisfied with the created and/or updated decision tables, the user will subsequently activate the decision table Upon activating the decision table, the data model is created and is used by one or more consumers (e.g., flow plan, enterprise rule, and the like) to return a decision answer based on passed values for decision inputs. Referring to the decision table execution phase, in one embodiment, the decision table module includes decision table APIs that can be called from other applications or consumers on the aPaaS platform. The consumer calls the decision table API and passes the necessary inputs (e.g., values for decision inputs corresponding to the decision table and a decision table ID of the decision table that is to be called). Based on the passed values, the API calculates a decision answer whose condition logic resolves to be true for the passed values of the decision inputs. The API then returns the calculated decision answer to the calling function.

The aPaaS platform of the client instance can create, modify, manage and execute flow plans or enterprise rules that consume decision tables and support a broad-range of uses cases pertaining to automating enterprise, IT, and/or other organization-related functions. The aPaaS platform may also be able to accommodate different user personas, such as IT workers and process-orientated programmers to non-IT line of enterprise customers or decision makers. For example, one use case involves creating and executing a flow plan that consumes a decision table pertaining to security incident notification. In this use case, a user can design the flow plan's trigger element to activate when a security incident is created. In response to this trigger, the flow plan creates a task (e.g., action element) for a Security Response Team to immediately investigate the security incident, and send potential security breach notifications. Additionally, the flow plan may also provide that when the Security Response Team closes out the created task, the recorded incident is updated with the finding of the Security Response Team Still further, the flow plan may consume a decision table that returns a type of security incident (e.g., service attack, malware attack, criminal investigation, and the like) as a decision answer (e.g., simple textual string), based on decision inputs (e.g., department, security category, and the like) corresponding to the recorded security incident that triggered the flow plan That is, the decision table may return from among a plurality of decision answers, a decision answer that indicates what type of security incident the recorded security incident corresponds to, based on current values for the decision inputs passed to the decision table by the flow plan. The flow plan may then execute a corresponding flow path (including one or more corresponding decision answer action elements) corresponding to the decision answer returned by the decision table, to execute an appropriate triage or containment path or flow based on the type of security incident (e.g., disable a port on a router, run anti-malware, notify IT helpdesk, notify the police department, notify the fire department, and the like) returned by the decision table.

In another use case example, an enterprise rule that consumes a decision table may be created and executed on the aPaaS platform. In the use case, the enterprise rule may pertain to setting a contract template (e.g., application object) based on a decision answer returned by the consumed decision table that defines a plurality of different types of contract templates as decision answers, and respective condition logic based on decision inputs (e.g., department, region, contract type, and the like) to arrive at and return one of the plurality of types of contract templates as a decision answer for a given passed value of the decision inputs. The contract template may be an application object (e.g., template object) in another part of the aPaaS platform and may correspond to a record in a table and associated metadata. In this use case, a user can set an enterprise rule's trigger element to activate when a recorded contract is created in a contract case table. In response to this trigger, the enterprise rule may obtain values corresponding the department, region, and contract type fields of the recorded contract, and pass these values to the decision table being consumed by the enterprise rule as decision inputs. The decision table may then return one of a plurality of types of contract templates as a decision answer based on condition logic defined by the decision table. The enterprise rule may then set a field value of the recorded contract that triggered the enterprise rule with the returned type of contract template, thereby referencing an application object in another part of the aPaaS platform from the set field value of the recorded contract. The decision table in this use case can thus be used to serve up a series of contract templates depending on predetermined conditions set in the decision table, and like each new contract record in the contract table to a corresponding contract template based on conditions defined in the decision table. Significantly, the decision table is a separate re-usable construct including condition logic that is consumed by the enterprise rule. As a result, changes made to the decision table can be managed independently. For example, values for the decision inputs required for the decision table to return a particular contract template as a decision answer can be changed and this change will automatically propagate to the enterprise rule, next time the enterprise rule executes and calls the decision table API with passed values for the decision inputs. Also, additional contract templates can be added and corresponding condition logic defined in the decision table. In this case also, next time the enterprise rule executes, the newly added contract template may be returned by the decision table, if the passed values for the decision inputs satisfy the corresponding condition logic. This use case is further illustrated in the embodiments shown in FIGS. 7-12.

By decoupling process logic of the enterprise rule or flow plan from enterprise or policy logic of the decision table, changes can be easily made, for example, to a decision table, without affecting the enterprise rule or flow plan consuming the decision table. Further, utility of the enterprise or policy logic can be increased by making it re-usable by multiple automated processes or consumers in different parts of the system. As a result, policy updates (e.g., change in price, new contract template, and the like) affecting policy logic can be easily applied system-wide without having to make changes individually to each automated process that consumes the said policy logic. By way of another example use case, an automated process (e.g., flow plan, enterprise rule, and the like) on the aPaaS platform pertaining to insurance coverage may be created so that the process consumes a decision table. The decision table may take a complex set of values for decision inputs such as location, age, crash history, car make, car model, car year, and the like, and return a level of coverage as a decision answer. That is, the condition policy logic in the decision table may be defined to evaluate to a coverage level such as bronze, silver, or gold (i.e, decision answers). In such a use case, if the requirements for a gold coverage level changes, then a non-developer (e.g., non-IT enterprise manager or decision maker making policy decisions) can change the requirements for a gold insurance rating by changing the conditions inside of the condition builder in the decision table via a decision table user interface, without having to individually change the one or many automated processes that may be consuming the decision table implementing the policy logic. Thus, decision tables and underlying policy logic (e.g., decision answers or condition logic for each decision answer) may change over time to align with enterprise goals or outcomes. However, since the decision tables are decoupled from the consumer that implements the tables to carry out process logic, the configuration of the process logic of the consumer (e.g., flow plan, enterprise rule, enterprise logic, script includes, scheduled jobs, and the like) remains unchanged.

Figure 2:
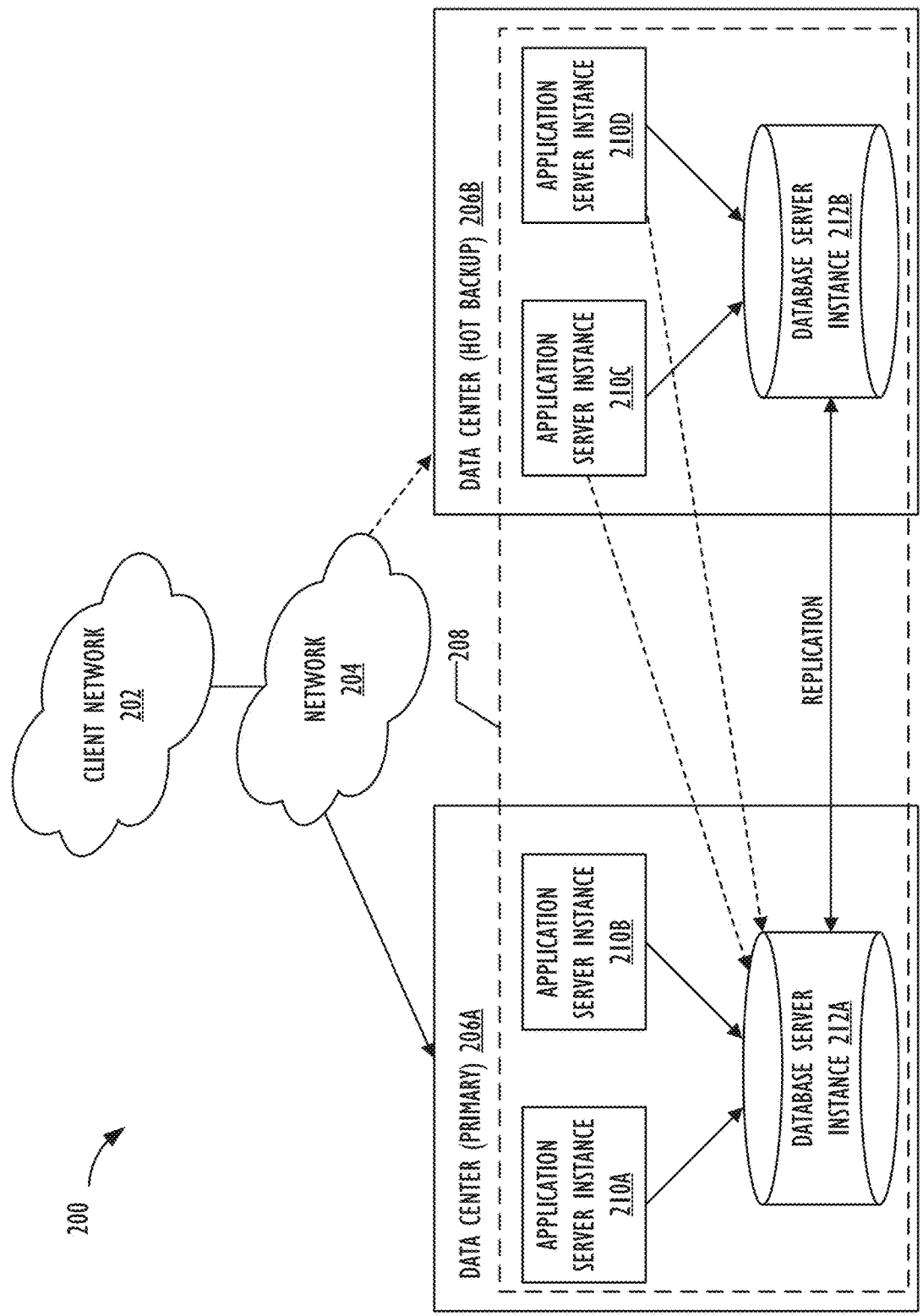
FIG. 2 is a schematic diagram of an embodiment of a multi-instance cloud architecture where embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110 (e.g., aPaaS platform/network). Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
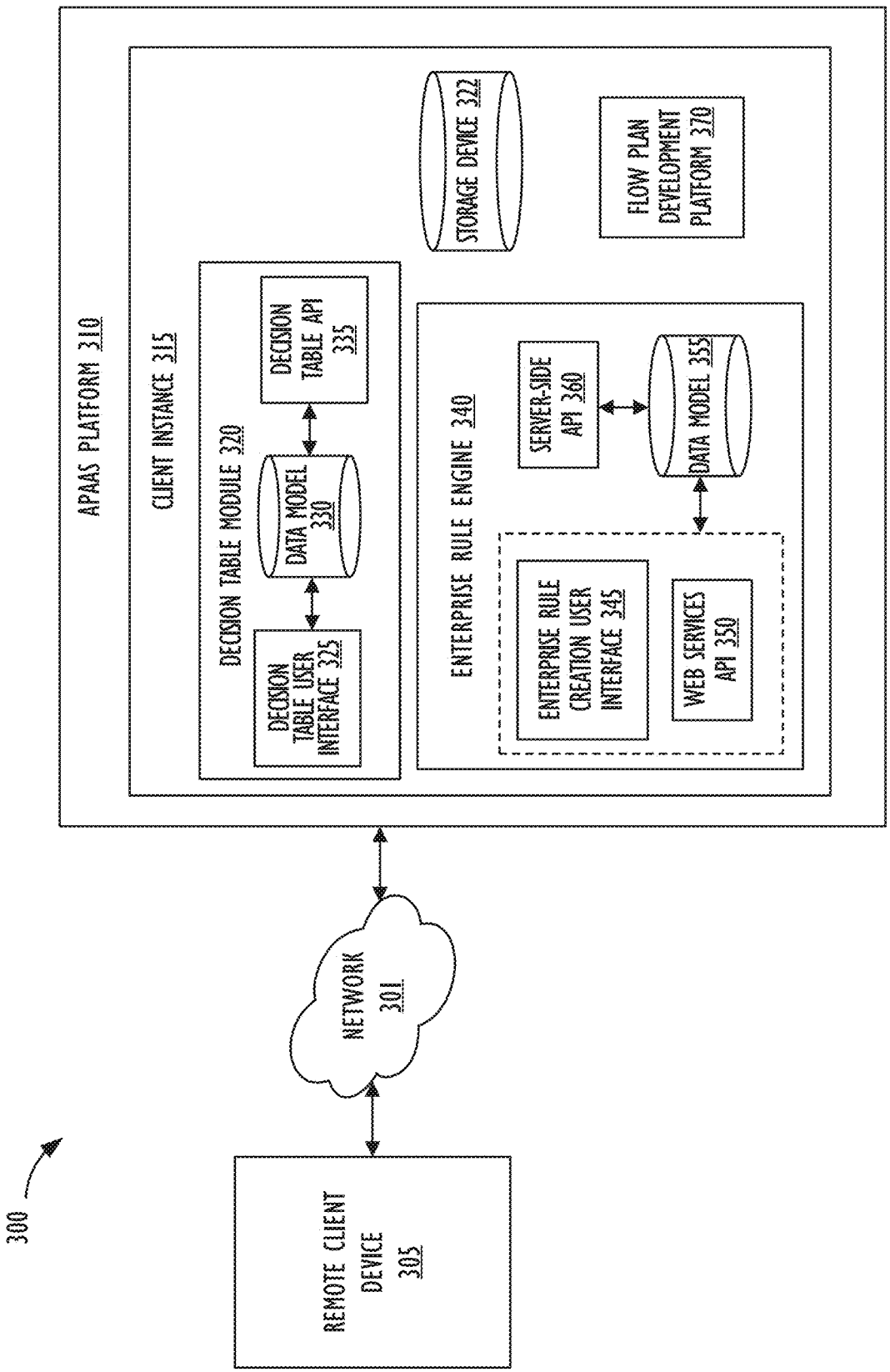
FIG. 3 is a block diagram of an embodiment of a cloud-based application platform as a service (aPaaS) platform for creating, modifying, managing, and executing flow plans and enterprise rules that act as consumers of decision tables.

FIG. 3 illustrates a block diagram of cloud computing system 300 where one or more embodiments of the present disclosure may operate. As shown in FIG. 3, cloud computing system 300 may include remote client device 305 and aPaaS platform 310 that are communicatively coupled to each other through network 301. Remote client device 305 may be substantially similar to any of client devices 104A-E, as described in FIG. 1. Network 301 may be substantially similar to any of client network 102 and network 108, as described in FIG. 1. Detailed description of remote client device 305 and network 301 is omitted here. Further, aPaaS platform 310 may be substantially similar to cloud resources platform/network 110 described in FIG. 1, and aPaaS platform 310 may include one or more client instances 315. Client instance 315 may be substantially similar to client instance 208, as described in FIG. 2. Client instance 315 may be hosted on cloud resources platform/network 110, as described in FIG. 1, and may be accessible by a user of remote client device 305 via network 301 through an application interface such as, for example, a graphical user interface (GUI) or a web browser executing on remote client device 305, in order to access software applications, services, and data deployed on client instance 315.

Client instance 315 may include decision table module 320, storage device 322, enterprise rule engine 340, and flow plan development platform 370. Client instance 315 may act as a hosted client instance platform for deploying various enterprise and/or IT related software applications and related enterprise data on a relational database. The enterprise data may be stored in storage device 322 and may correspond to data of a plurality of rows (or records) of a plurality of tables of the database. The database may be updated in real-time as a user interacts with (e.g., insert, update, delete a record in a table) client instance 315. The software applications hosted on client instance 315 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules of the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

Decision table module 320 may include decision table user interface 325, data model 330, and decision table APIs 335. Decision table module 320 provides a re-usable resource of condition logic (policy logic) for consumption by a variety of automated processes (e.g., flow plans, enterprise rules, enterprise logic, script includes, scheduled jobs, and the like) on aPaaS platform 310. Decision table module 320 may be a globally scoped application that supports application scoping and may be provided out of the box on client instance 315. Decision table module 320 enables enterprise users (e.g., non-IT enterprise owners or decision makers implementing policy logic) without programming knowledge but with policy knowledge to manage data values (e.g., decision answers, decision inputs, values for the decision inputs, and condition logic to arrive at the respective decision answers) or policy logic that drive an automated process, without process owners (e.g., developers) having to modify or re-configure the automated processes that may consume the policy logic (e.g., decision tables) managed by decision table module 320. That is, decision table module 320 enables decision making users to centralize creation, modification, and management of decision tables for consistent consumption by other applications across different application suites on aPaaS platform 310. A decision table (e.g., decision tree) may be considered to be a visual representation that allows a user to specify which actions (e.g., action elements) to perform depending on a returned decision answer or flow path. The information expressed in the decision table could be used to inform automated processing logic (e.g., flow plans, enterprise rules, enterprise logic, script includes, scheduled jobs, and the like) for a decision tree. For example, in a flow plan use case, decision table module 320 may serve-up (e.g., provide or return) decision answers that are returned via decision table API 335 to dynamically build a decision tree during design-time. Then during runtime, decision table module 320 may provide decision table API 335 to serve-up the calculated decision answer based on given passed values for decision inputs from the automated process or consumer so that the consuming process can determine which path the flow will take within the tree, and perform corresponding actions.

In one embodiment, the design-time implementation of the decision table can be done through standard platform forms and lists via decision table user interface 325. Decision table module 320 may be created using any suitable programming language (e.g., Java®) and database management system including one or more relational database tables. In one embodiment, decision table module 320 may be implemented based on a user completing and saving a decision table form with field values via decision table user interface 325, calling a Java API that interfaces with a configuration management database (CMDB) to create data model 330 corresponding to the completed and saved decision table form, and providing one or more decision table APIs for interacting with consumers of the created and saved decision table and for providing the re-usable conditional policy logic in other parts of aPaaS platform 310.

Decision table user interface 325 may include standard platform forms and lists for enabling a user with appropriate privileges (e.g., enterprise decision maker or policy logic manager) to create, update, activate/deactivate, delete, or manage decision tables. For example, decision table user interface 325 may enable a user of remote client device 305 to create decision tables and set corresponding decision inputs (e.g., rows or fields or attributes of a table), and condition logic defining conditions based on the decision inputs (e.g., values for the decision inputs) that result in respective corresponding decision answers. In one embodiment, decision table user interface 325 may be located on a client device that receives user input. A decision table may have a corresponding answer table, a question table, and one or more decision inputs. The answer table may contain all available decision answers for the decision table. Each decision answer can either be a simple answer or a path or reference to an application object. The question table may contain the conditions (i.e., condition logic or definitions or values for the decision inputs) to evaluate and the decision answer they relate to. And the decision inputs may include inputs for making the decision. In one embodiment, the decision inputs may be new glide variable table inputs so that each decision table can have respective corresponding variable decision inputs. Decision table API 335 (e.g., Java API, REST API, and the like) may evaluate a decision table based on given passed values for the decision inputs, and a decision table ID, and return decision answers evaluated as true. Decision table API 335 may also include additional API points for retrieving all active decision tables, as well as getting all details about a single decision table. In one embodiment, decision table API 335 may be a REST API so various automated processes (e.g., flow plan, enterprise rules, and the like) can integrate and consume the decision table.

Figure 4:
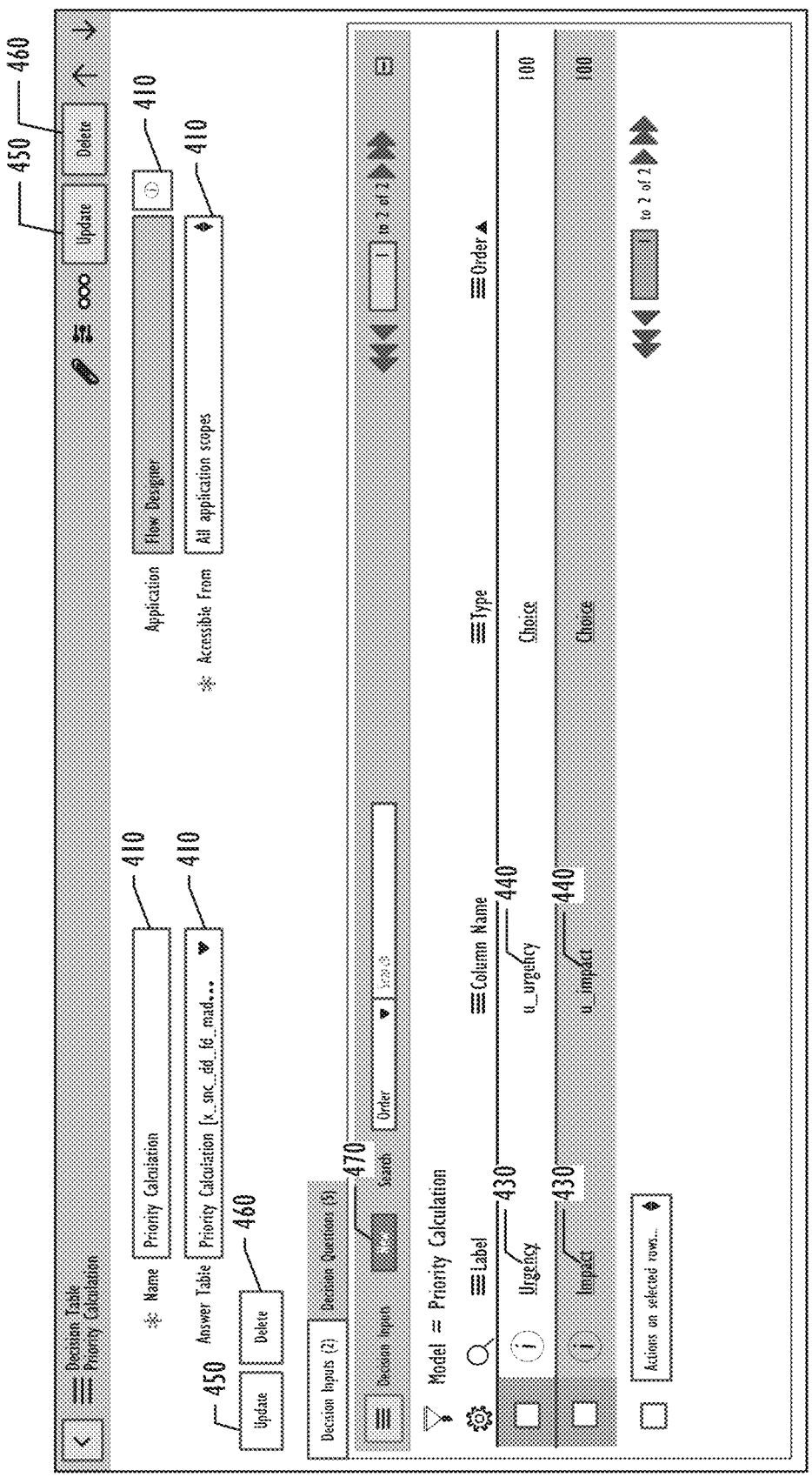
FIG. 4 illustrates an embodiment of a decision table a user can create with a decision table user interface.
Figure 5:
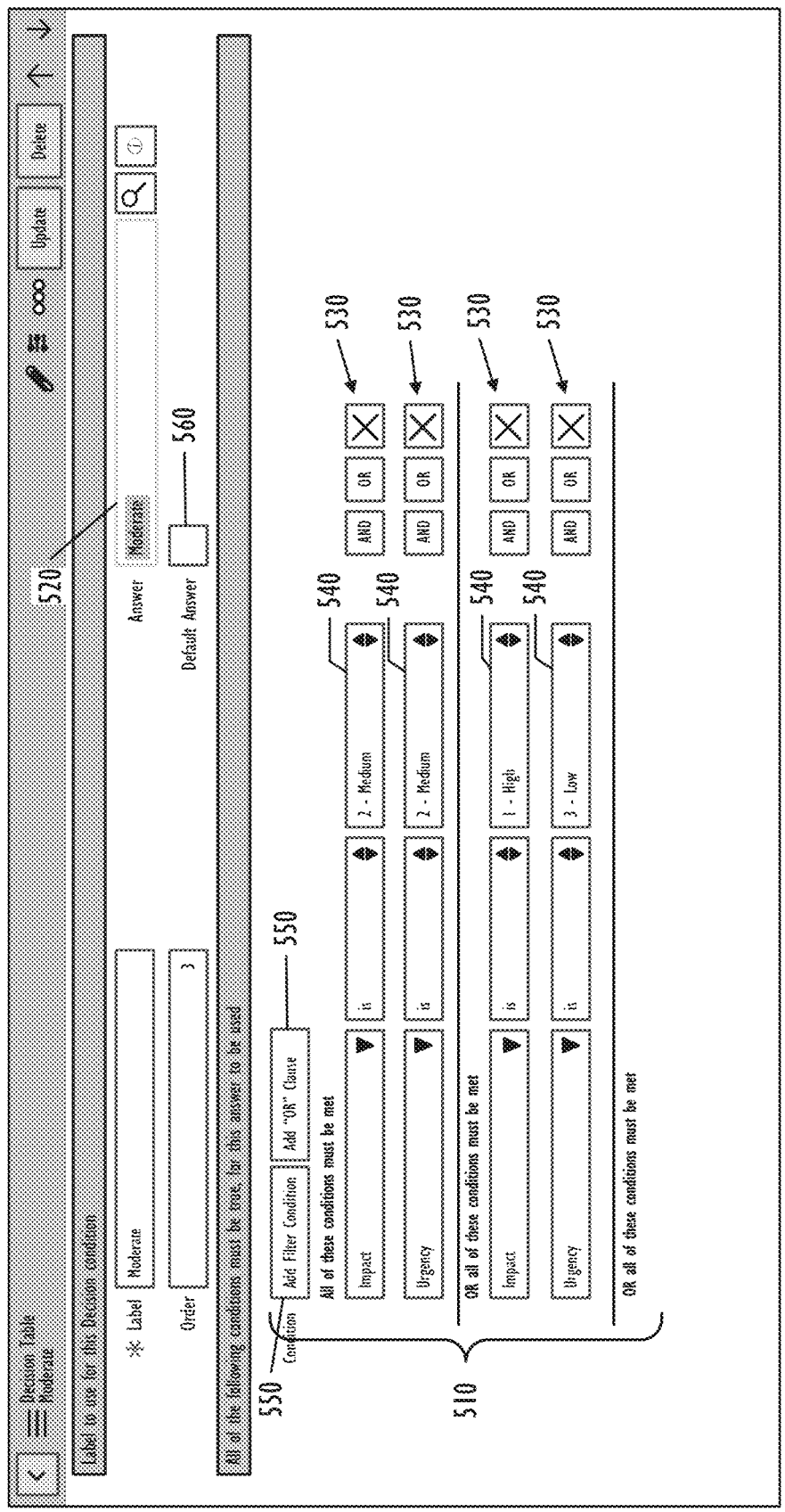
FIG. 5 illustrates an embodiment of condition logic of a decision table a user can create with the decision table user interface.
Figure 6:
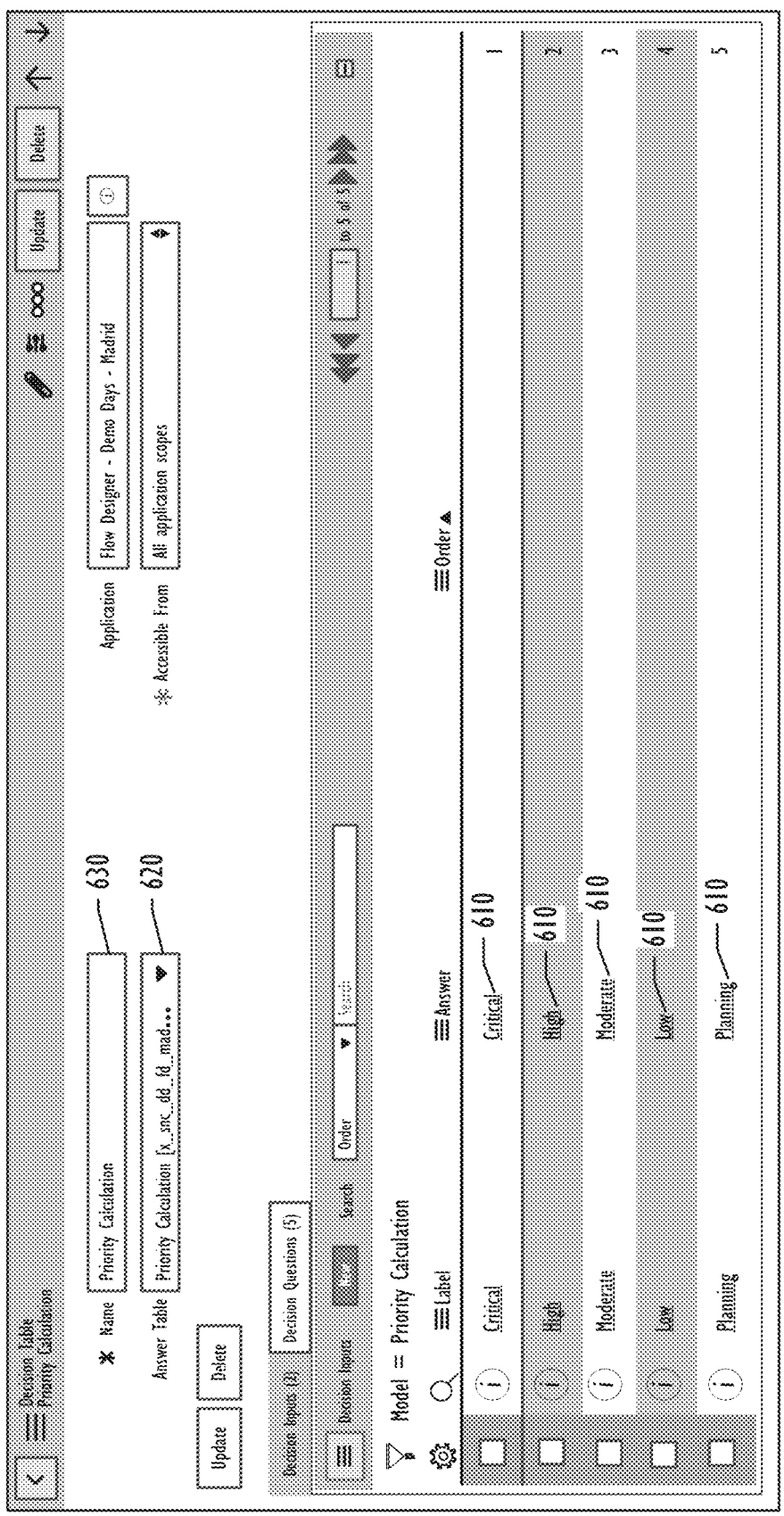
FIG. 6 illustrates an embodiment of an answer table of a decision table a user can create with the decision table user interface.

One example use case of a decision table (and corresponding set decision inputs, question table indicating the condition logic, and answer table of decision answers) created by a user with decision table user interface 325 is shown in FIGS. 4-6. As shown in FIG. 4, decision table user interface 325 permits a user to create and modify a human-readable version of the decision table based on enterprise policy logic. For example, a user (e.g., decision maker with policy knowledge but without programming knowledge) may create a new decision table pertaining to priority calculation based on given values for decision inputs, where the table returns a "priority" decision answer. For example, the decision table may return as the decision answer, a value (e.g., "High", "Moderate", "Low", "Critical", and the like) for a priority field of a triggering record, where the value for the priority field is calculated by the decision table based on values for decision inputs. The user may provide various attributes 410 to create and save the decision table. For example, the attributes 410 may include decision table Name, Answer Table name which stores decision answers corresponding to the decision table, Application, and the like. Further, as shown in FIG. 4, the user may also set one or more fields (e.g., attributes or column names 440 of a particular selected database table) as decision inputs 430. In the example shown in FIG. 4, the user sets the Impact and Urgency (column names "u_urgency" and "u_impact") columns of an incident table as decision inputs 430 to the Priority Calculation decision table. As is evident from FIG. 4, decision table user interface 325 also allows the user to update 450 or delete 460 the decision table or make changes to decision inputs 430 or add new 470 decision inputs to the decision table.

Further, as shown in FIG. 5, decision table user interface 325 allows the policy logic setting user to specify complex condition logic 510 based on values for decision inputs 430 to resolve to a particular decision answer 520 when the one or more conditions 530 specified in the condition logic 510 are determined to be true for a given value 540 of the decision inputs. Thus, in the example use case shown in FIG. 5, when the Impact is Medium and Urgency is Medium, or when the Impact is High and the Urgency is Low, conditions 530 of condition logic 510 will be determined to be true, and in this case, the Priority Calculation decision table will return the decision answer 520 of "Moderate". Using the condition builder shown in FIG. 5, additional conditions 530 may be added 550, or existing conditions 530 may be modified to update condition logic 510 or add new condition logic 510. Decision answer 520 may also be replaced with a different decision answer as the answer that is returned by the Priority Calculation decision table when condition logic 510 is satisfied. The user may also check the Default Answer box 560 to specify an answer that acts as a "catch-all" answer that is returned by the decision table when condition logic 510 of none of the decision answers associated with the decision table is satisfied.

Similar condition logic 510 may be specified by the user for each of a plurality of decision answers associated with the decision table using decision table user interface 325. As shown in FIG. 6, a plurality of decision answers 610 are stored in the Priority Calculation answer table 620 that is associated to the Priority Calculation decision table 630. Once the user is satisfied with the set decision inputs 430, and condition logic 510 of each of a plurality of decision answers 610, the user may save (and activate) the decision table. Decision table module 320 may then use a web service API or REST API to interface with a CMDB that creates data model 330 based on the activated decision table for providing the re-usable condition logic of the decision table in other parts of aPaaS platform 310. Decision table APIs 335 may then be utilized to accept given values for the decision inputs associated with the decision table and return, serve-up, or output a particular one of the plurality of decision answers 610 (or default answer 560), based on which conditions 530 of condition logic 510 of the decision table are determined to be true.

Figure 7:
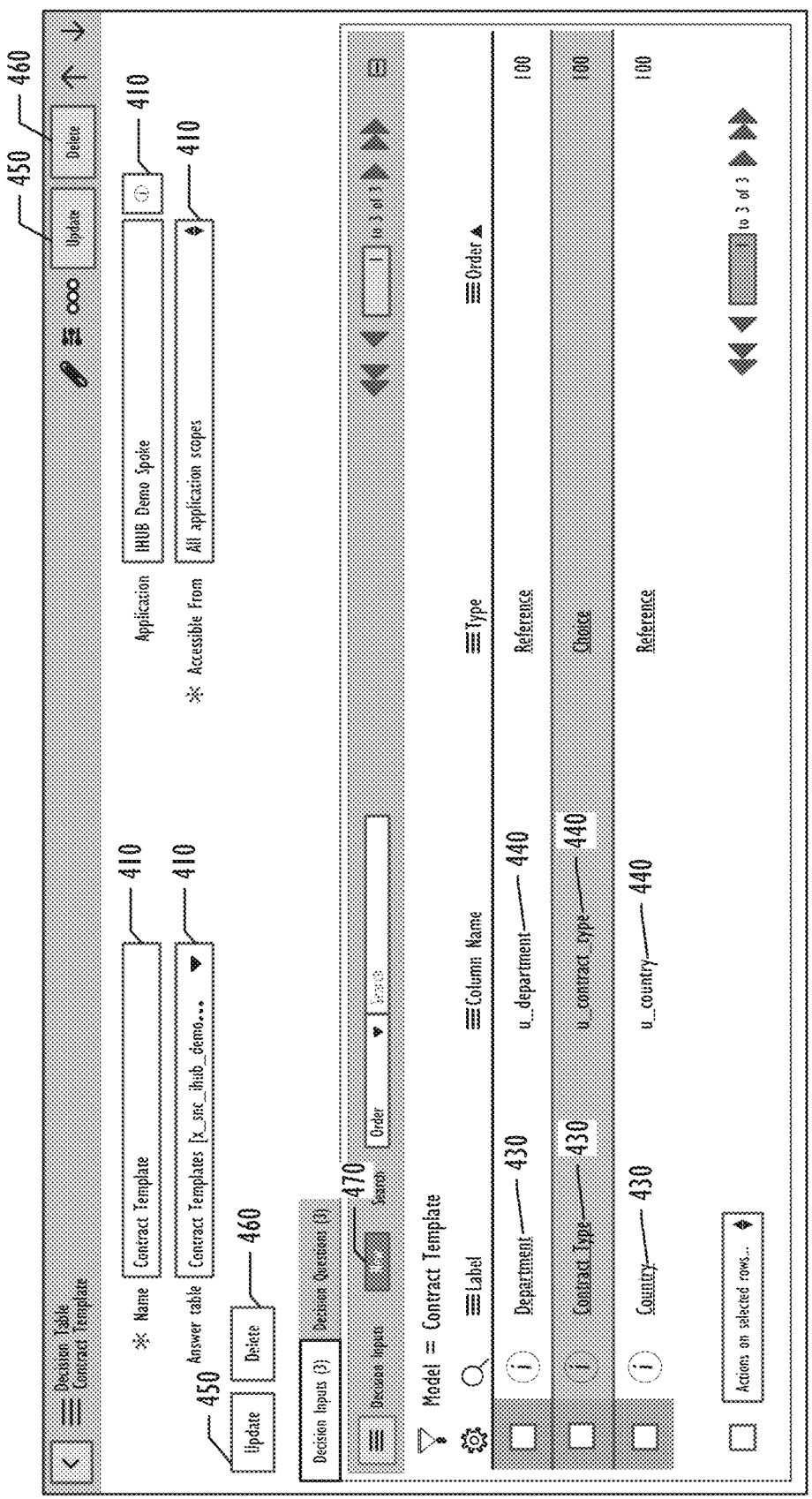
FIG. 7 illustrates another embodiment of a decision table a user can create with the decision table user interface.
Figure 8:
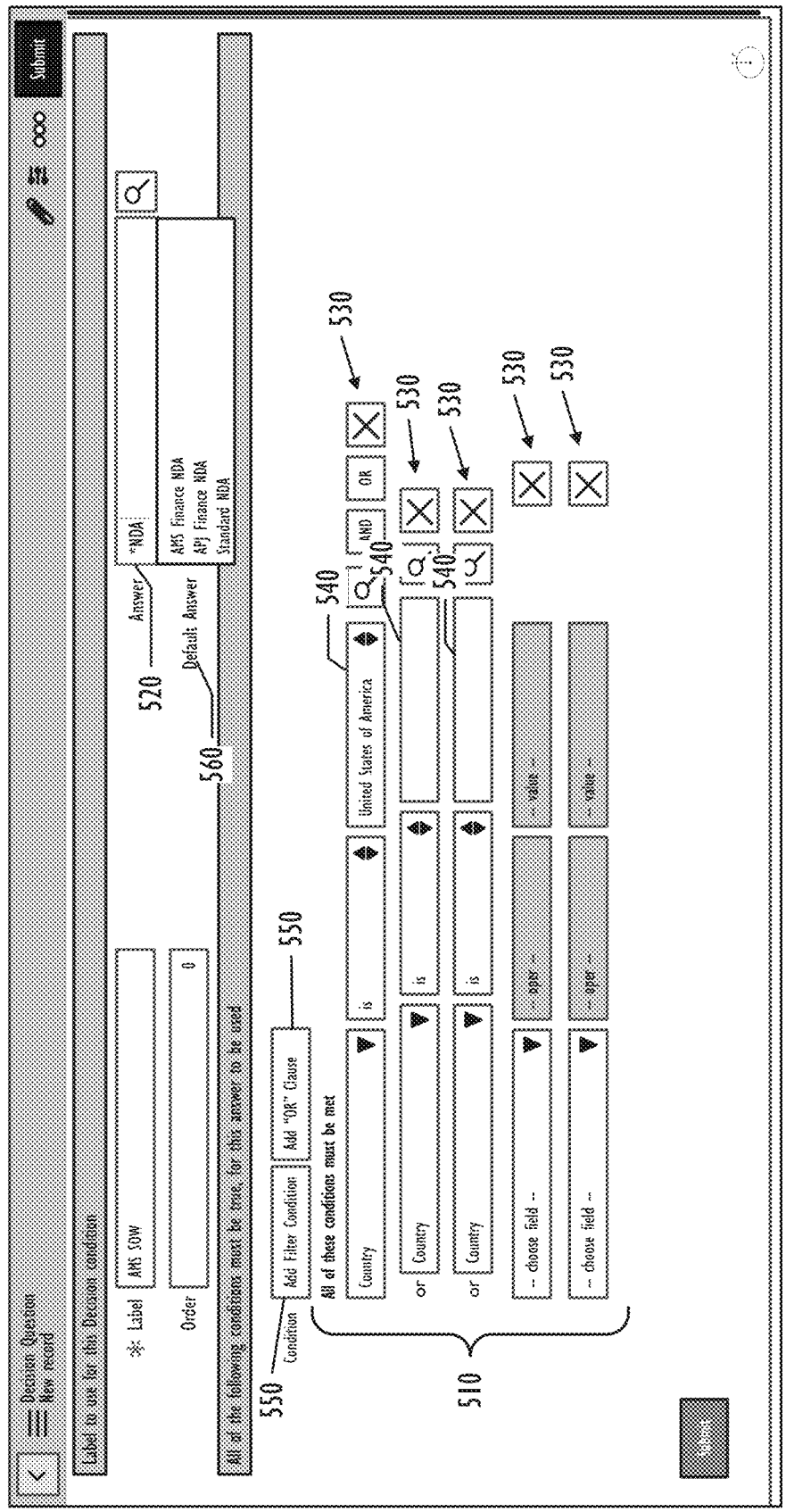
FIG. 8 illustrates another embodiment of condition logic of a decision table a user can create with the decision table user interface.
Figure 9:
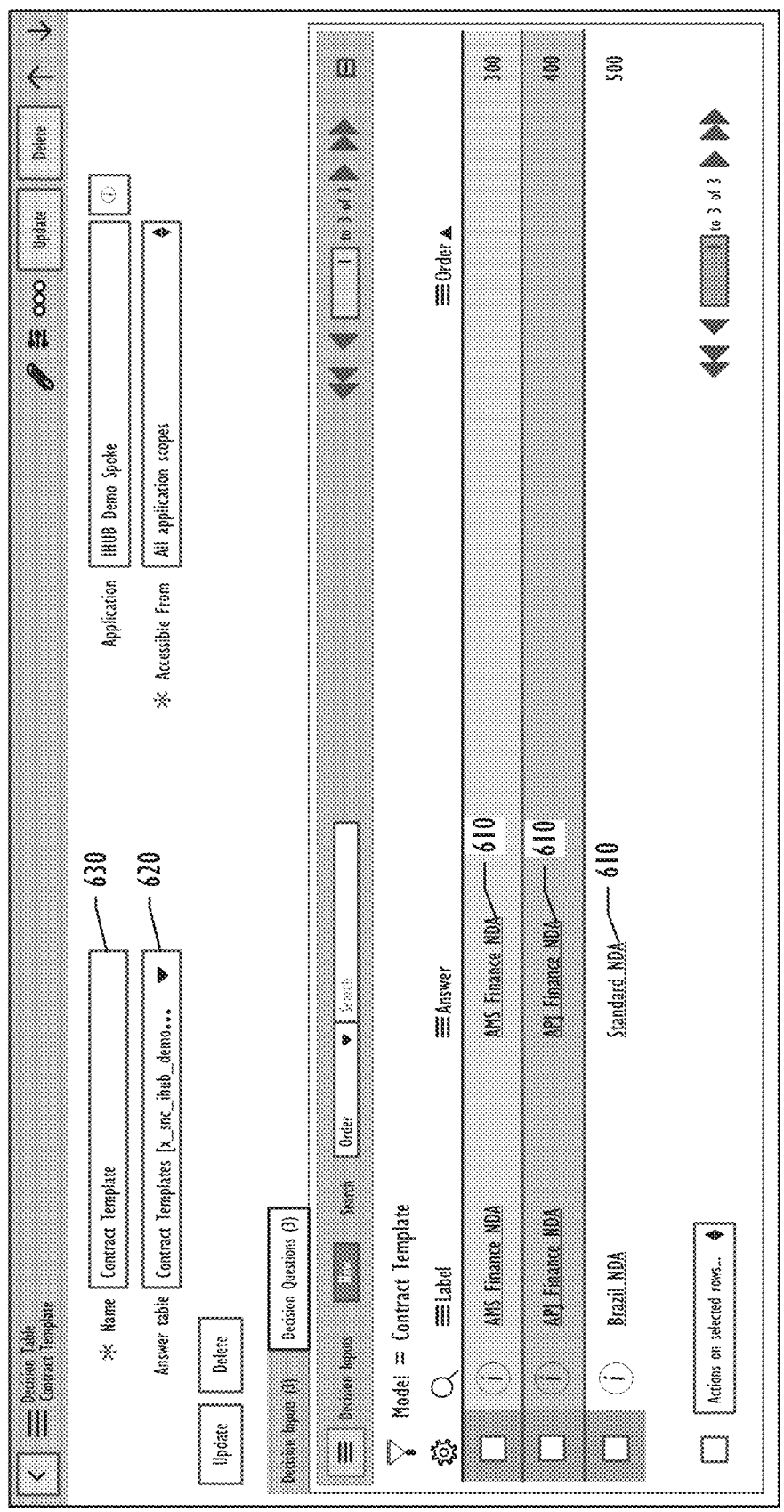
FIG. 9 illustrates another embodiment of an answer table of a decision table a user can create with the decision table user interface.

In the example use case shown in FIG. 4-6, the output decision answer 610 (e.g., Critical, High, Moderate, Low, Planning) is a simple answer (e.g., a text string, an integer, alphanumeric value, and the like) that can be utilized to, for example, update a field value of a record in a table in an automated process. However, this may not necessarily be the case. The decision answer 610 could also be a reference (e.g., link, or path) to an application object in another part of aPaaS platform 310. FIGS. 7-9 show another example use case of a decision table (and corresponding set decision inputs, question table indicating the condition logic, and answer table of decision answers) created by a user with decision table user interface 325, where the decision answers are a reference to an application object in another part of aPaaS platform 310.

As shown in FIG. 7, a user (e.g., decision maker with policy knowledge but without programming knowledge) may create a new decision table pertaining to contract templates based on decision inputs and returning a particular contract template as a decision answer. In the example shown in FIG. 7, via decision table user interface 325, the user sets the Department, Contract Type, and Country (column names "u_department", "u_contract type", and "u_country") columns of a contract table as decision inputs 430 to the Contract Template decision table. Further, as shown in FIG. 8, decision table user interface 325 allows the user to specify complex condition logic 510 based on the decision inputs 430 of FIG. 7 to resolve to a particular decision answer 520 when the one or more conditions 530 specified in the condition logic 510 are determined to be true for a given value 540 of the decision inputs. In the example use case in FIG. 8, decision answer 520 selectable by the user as the decision answer to be returned when corresponding condition logic 510 is satisfied is a reference to a particular type of contract template record (e.g., AMS Finance NDA, APJ Finance NDA, Standard NDA). Thus, based on the complex condition logic 510 specified by the user, the decision table calculates a particular type of contract template record (template object) as a decision answer. Similar condition logic 510 may be specified by the user for returning each of a plurality of decision answers using decision table user interface 325, and as shown in FIG. 9, a plurality of decision answers 610 can be stored in the Contract Templates answer table 620 that is associated to the Contract Template decision table 630. By saving a reference to an application object (e.g., contract templates AMS Finance NDA, APJ Finance NDA, Standard NDA, in the example use case shown in FIG. 9) in another part of aPaaS platform 310 as a decision answer 610, Contract Template decision table 630 provides re-usable policy logic that can link a record in a table (e.g., triggering record that activates the automated process) to another record in another table and associated metadata on aPaaS platform 310. Thus, decision table module 320 can serve up a series of record objects (e.g., series of work flow objects, series of case objects, series of project objects, series of template objects, or series of any application object that is available on aPaaS platform 310) in one or more tables as respective decision answers that are returned based on corresponding condition logic 510 specified in the decision table resolving to be true based on given values for the decision inputs. The plurality of decision answers 610 may respectively correspond to a series of rich application objects (e.g., flow objects, template objects, case objects, project objects, record objects, and the like) including a record in a table and associated metadata that can be selectively served up by the decision table depending on the decision answer calculated for given values for decision inputs.

Further, since the decision answer is a link or path to reference the corresponding application object, storing the returned decision answer by a consumer in a corresponding field of the triggering record allows the aPaaS platform to link the triggering record to another object or record in the system. The link could be to any object specified by the decision table based on passed values for decision inputs. This mechanism allows effective decoupling of policy logic underlying the decision table from process logic of a consumer that may consume the decision table so that changes made to the decision table (e.g., conditions required to be met to arrive at a particular decision answer are changed, and the like) do not require re-authoring of the consumer. That is, the consumer remains agnostic to the policy logic underlying the decision table. The consumer simply consumes the table, passes values for requested decision inputs to the table, and performs processing based on the returned decision answer. As illustrated by the example use case shown in FIGS. 7-9, reference record objects for the contract templates as decision answers 610 have been completely decoupled from the consumer that may consume the decision table and take actions based on the particular contract template returned by the decision table. As a result, an enterprise user that sets policy logic can manage the enterprise's list of contract templates or contract types and the respective condition logic that must be satisfied (e.g., based on particular values for the decision inputs) when returning the corresponding contract template or type. The user can also make changes to the policy logic to, for example, change the contract template or add a new contract template for a particular value for the decision inputs. As a result, next time the decision table is called by a consumer (via an API) with the particular values for the decision inputs, the decision table will return the reference or link of the updated or new contract template record and the consumer will populate the value accordingly to thereby link the updated or new contract template with the triggering record. Data related to decision table module 320 (e.g., decision tables, question tables including condition logic, and answer tables including associated decision answers) may be stored in storage device 322 of client instance 315. Alternately, the data may be stored in a storage device external to client instance 315.

Returning to FIG. 3, client instance 315 on aPaaS platform 310 further includes enterprise rule engine 340 which in turn includes enterprise rule creation user interface 345, web services API 350, data model 355, and server-side API 360. A user (e.g., IT user or developer developing automated processes logic) of client instance 315 having appropriate privileges may utilize enterprise rule engine 340 to create one or more enterprise rules for execution on client instance 315. An enterprise rule (e.g., enterprise logic, script includes, scheduled job, and the like) is a server-side script that can run when a record is displayed, inserted, updated, or deleted, or when a table is queried, and when corresponding role conditions (e.g., user class or group) or filter conditions (e.g., records filtered by user role, department, and the like) are met, or when an incoming REST API call arrives or a timer expires. By creating and executing enterprise rules, enterprise rule engine 340 can accomplish tasks (e.g., action elements) like automatically changing or setting values in form fields when certain conditions are met, or create events for email notifications, posting a message, and running a script. In case an enterprise rule consumes a decision table, enterprise rule engine 340 executing the enterprise rule can also accomplish tasks like taking actions based on the decision answer returned by the consumed decision table, or setting field value based on the returned decision answer. The enterprise rule may include one or more trigger elements which specify when to execute or activate the enterprise rule, and one or more action elements (e.g., decision action elements) which specify what actions to take when the enterprise rule is executed or activated.

A user accessing client instance 315 from, e.g., a web browser on remote client device 305 may utilize enterprise rule engine 340 to create an enterprise rule. Enterprise rule creation user interface 345 may be utilized by the user to create or modify a human-readable version of the enterprise rule. In case the enterprise rule being created by the user consumes a decision table, enterprise rule creation user interface 345 acts as an integration point to allow a user to select one of the decision tables of decision table module 320 for consumption by the enterprise rule and receive a decision answer returned by the decision table to the enterprise rule based on given values for decision inputs passed to the decision table API by the enterprise rule during execution. In one embodiment, enterprise rule creation user interface 345 may be located on a client device that receives user input.

Figure 10:
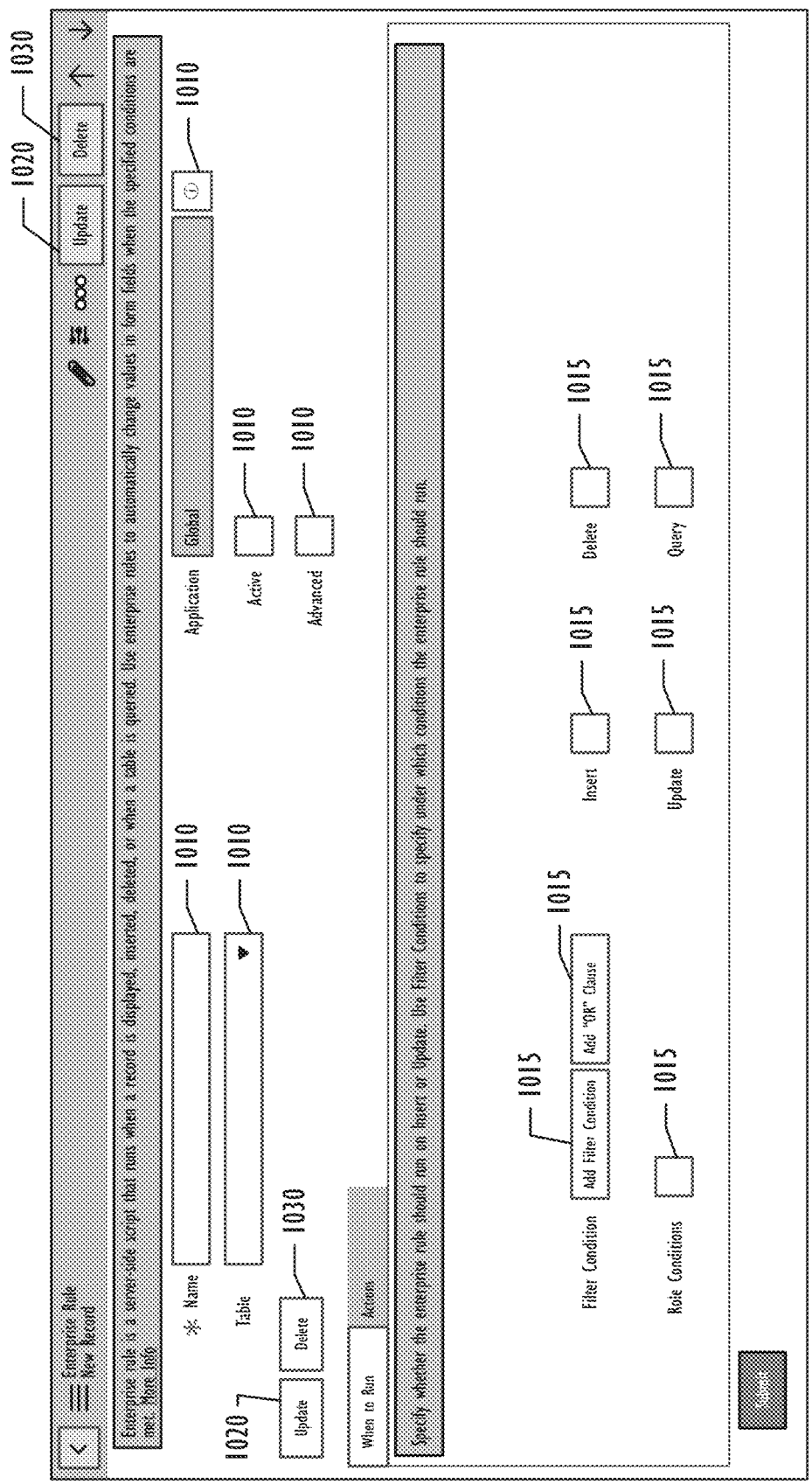
FIG. 10 illustrates an embodiment of an enterprise rule that a user can create to consume a decision table with an enterprise rule creation user interface.
Figure 11:
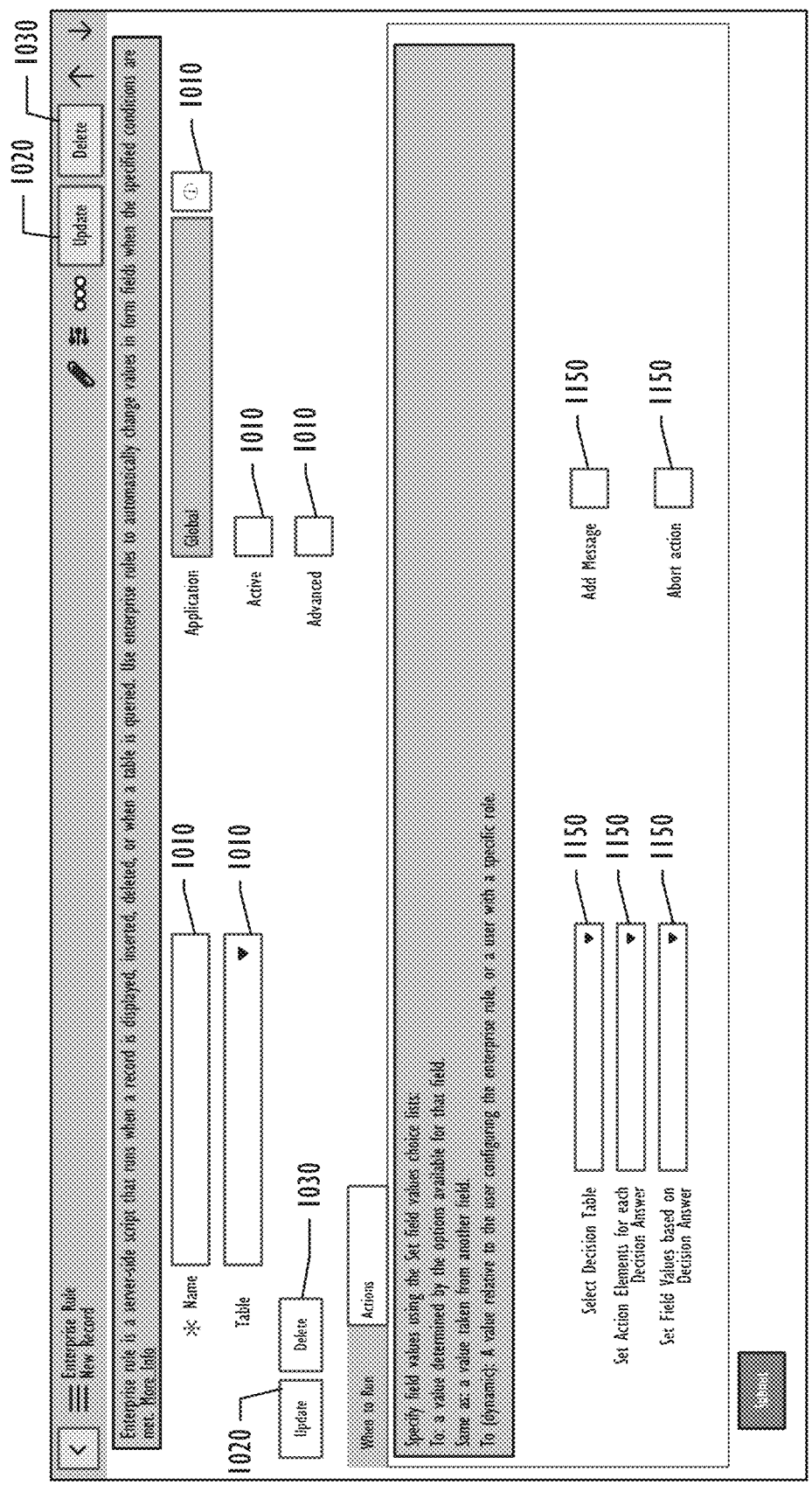
FIG. 11 illustrates another embodiment of an enterprise rule that a user can create to consume a decision table with the enterprise rule creation user interface.

FIGS. 10-11 illustrate embodiments of enterprise rule creation user interface 345 permitting a user to create and modify a human-readable version of an enterprise rule. As shown in FIG. 10, a user can utilize enterprise rule creation user interface 345 of enterprise rule engine 340 to create a new enterprise rule by setting attributes 1010 and 1015 of the new enterprise rule. Attributes 1010 may include a Name for the enterprise rule; selection of a Table (e.g., any table of client instance 315 on aPaaS platform 310) that the enterprise rule runs on; selection of an application that contains the enterprise rule; a checkbox to enable/disable the enterprise rule; a checkbox to enable/disable advanced features for the enterprise rule; and the like. Attributes 1015 may specify predetermined computing conditions (e.g., trigger element) that must be met for the enterprise rule to run on the selected Table 1010. Attributes 1015 may include setting of one or more Filter Conditions using a condition builder to determine when the enterprise rule should run based on the field values in the selected Table (e.g., record created in the selected table by user of a certain group or department, and the like); selection of roles that users who are modifying records in the selected Table must have for this enterprise rule to run; a checkbox to enable/disable execution of the enterprise rule when a record is inserted into the selected Table; a checkbox to enable/disable execution of the enterprise rule when a record is updated into the selected Table; a checkbox to enable/disable execution of the enterprise rule when a record is deleted from the selected Table; a checkbox to enable/disable execution of the enterprise rule when a record in the selected Table is queried; and the like. As is evident from FIG. 10, enterprise rule creation user interface 345 also allows the user to update 1020 or delete 1030 an existing saved enterprise rule or make changes to any of the attributes 1010, 1015 or add additional attributes 1010, 1015 to the enterprise rule (e.g., add additional filter conditions that must be met for the enterprise rule to run).

Further, as shown in FIG. 11, enterprise rule creation user interface 345 allows the user to specify actions (e.g., action elements, decision answer action elements, default decision answer action elements) 1150 to execute when the enterprise rule is run (i.e., when the trigger element of the enterprise rule is initiated or satisfied or activated). Action elements 1150 that may be set by the user for execution when trigger conditions of the enterprise rule are satisfied include setting field values of the selected Table to a specific value, or to be the same as another specified field value, or to a value relative to the user configuring the enterprise rule or a user with a specific role, and the like; adding a specific message that appears when this enterprise rule is run; aborting the current database transaction when this enterprise rule is run (e.g., if the conditions are met, do not insert the record into the database); and the like.

In case the enterprise rule consumes a decision table of decision table module 320, action element 1150 that may be settable by the user for execution when the enterprise rule is run may also include decision action elements. That is, enterprise rule creation user interface 345 of enterprise rule engine 340 may act as an integration point to allow a user to create an enterprise rule that consumes a decision table and that performs actions based on a particular decision answer returned by the consumed decision table when given values are passed to the decision table as decision inputs. To this end, as illustrated in FIG. 11, action element 1150 that may be set by the user for execution when trigger conditions of the enterprise rule are satisfied may further include selecting a decision table; selecting what values (what attributes or fields of the record that triggered the enterprise rule) to pass as decision inputs to the decision table; setting one or more action elements for each decision answer of the decision table so that when the enterprise rule is run, one or more actions specified by the enterprise rule as corresponding to the particular decision answer returned by the decision table are executed; and setting one or more default decision answer action elements to be executed when none of the plurality of decision answers associated with the decision table is satisfied based on passed values for the decision inputs.

By way of example, in the use case described above in connection with FIGS. 7-9 pertaining to the Contract Template decision table, when an enterprise rule is created to run on the Contract table (e.g., enterprise rule set to trigger when a new contract record is created in the Contract table) by utilizing the enterprise rule engine 340, and when the Contract Template decision table is selected as action element 1150 (e.g., decision action element) in the Contract enterprise rule, enterprise rule engine 340 may, e.g., set a field value of the new record on the Contract table that triggered the Contract enterprise rule to reference a particular contract template that is returned as a decision answer. The example use case of setting the field value by the enterprise rule consuming the Contract Template decision table is shown with reference to FIG. 12.

Figure 12:
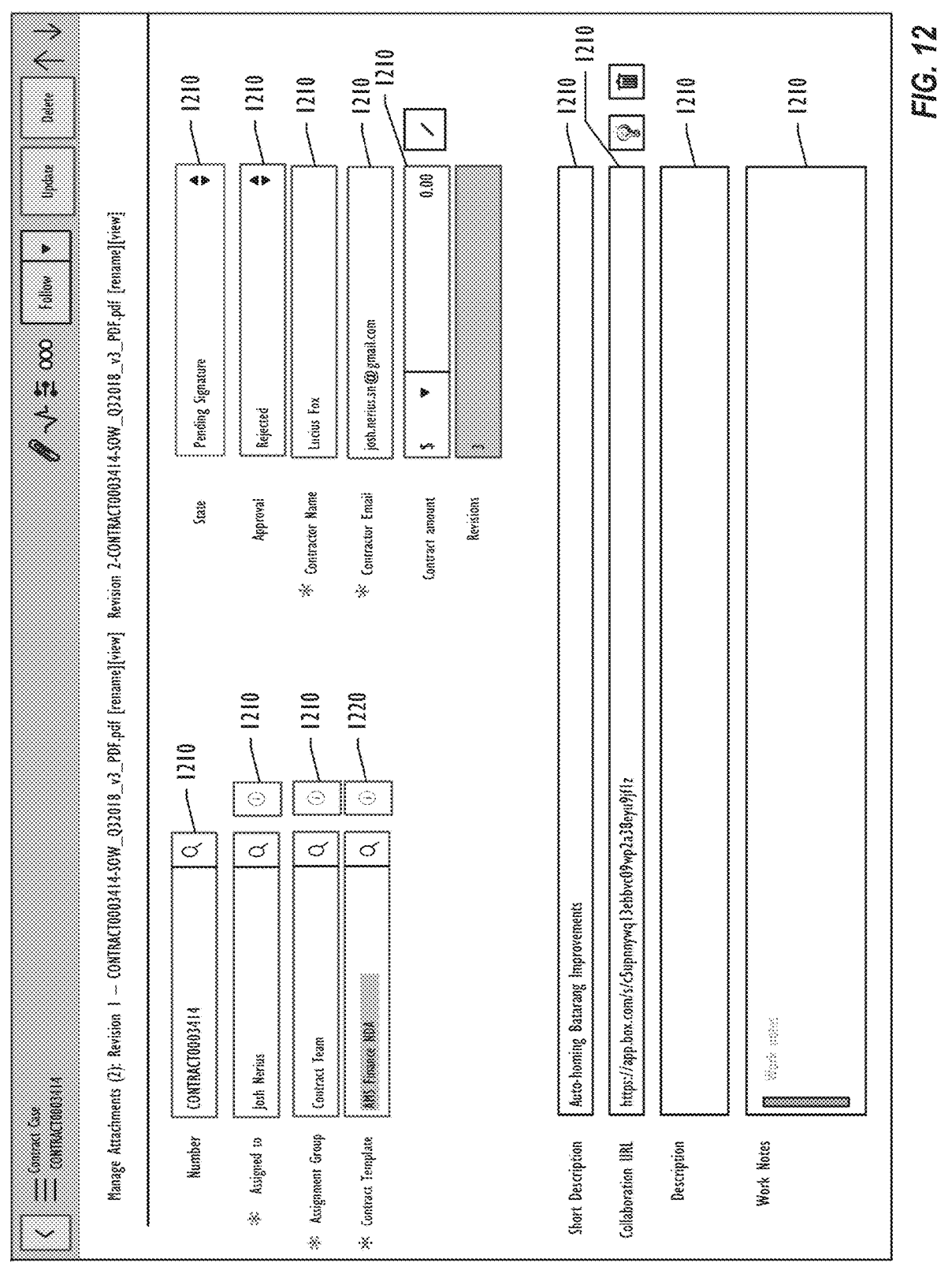

In the example use case shown in FIG. 12, it is assumed that an enterprise rule that runs on top of the Contract table is already set by enterprise rule engine 340, and that the enterprise rule consumes the Contract Template decision table (FIGS. 7-9). In this case, for example, a user creates a new contract in the Contract table and sets appropriate attributes 1210 (e.g., Number, Assigned to, Assignment Group, and so on) of the contract record by filling out a form. This record creation causes enterprise rule engine 340 to initiate execution the Contract enterprise rule corresponding to the Contract table as a server-side script, since the trigger element specified by attributes 1015 of the Contract enterprise rule is determined to be satisfied and activated. In one embodiment, enterprise rule engine 340 may initiate execution the Contract enterprise rule before the new contract record is saved in the contract table. In another embodiment, enterprise rule engine 340 may initiate execution the Contract enterprise rule after the new contract record is saved in the contract table. In either case, in running the enterprise rule, enterprise rule engine 340 communicates with decision table API 335 and provides decision table module 320 with the consumed Contract Template decision table identifier, and with values (based on input values for attributes 1210) for the decision inputs 430 (e.g., values for Department, Contract Type, and Country fields) corresponding to the new record in the Contract table (numbered "CON-TRACT0003414"). In response, decision table module 320 calculates a decision answer (in this case, one of a plurality of types of contract templates, e.g., one of AMS Finance NDA, APJ Finance NDA, Standard NDA contract templates) based on condition logic stored in the Contract Templates decision table and returns the decision answer via decision table API 335 to enterprise rule engine 340 running the Contract enterprise rule. Enterprise rule engine 340 may then set a field value of attribute 1220 (labeled "Contract Template") of the current Contract record (numbered "CON-TRACT0003414") based on the decision answer served up by the decision table. Further, in this case, since attribute 1220 is a reference to an application object (e.g., particular type of contract template from among plural types; template object) in another part of aPaaS platform 310, attribute 1220 acts to link the contract record numbered "CON-TRACT0003414" in the Contract table to another record (having data in a plurality of columns) corresponding to "AMS Finance NDA" contract template and corresponding metadata in, e.g., a Contract Templates table (e.g., record in a table). Thus, contract record numbered "CON-TRACT0003414" is linked to a rich template application object, and similarly, multiple contracts in the Contract table can be linked to multiple rich template objects based on decision answers of the consumed decision table.

Returning to FIGS. 10-11, once the user is satisfied with the specified attributes 1010, trigger elements 1015, and action elements 1150 of the enterprise rule, the user may save the enterprise rule by causing the enterprise rule creation user interface 345 to interact with web service API 350 and interface with a CMDB that creates data model 355 corresponding to the new created (or updated) enterprise rule. Data model 355 of the enterprise rule may then be used by server-side APIs 360 to generate server-side logic or script to take actions (e.g., action elements 1150) when trigger elements (e.g., attributes 1015) defined by the enterprise rule are activated.

Figure 13:
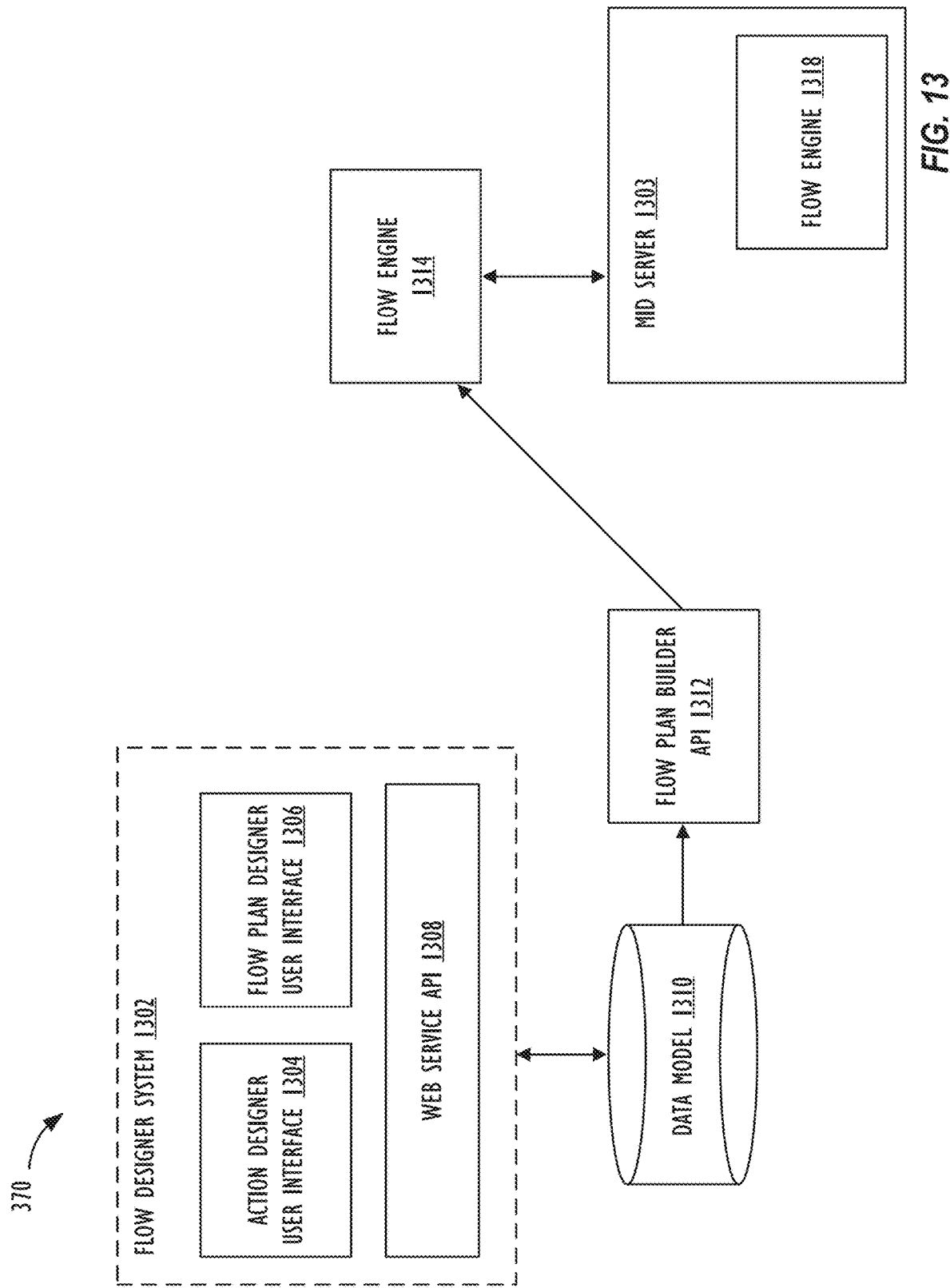
FIG. 13 is a block diagram of an embodiment of an automation system of a flow plan development platform for creating, modifying, managing, and executing a flow plan that consumes a decision table.

Returning to FIG. 3, client instance 315 also includes flow plan development platform 370 for creating, modifying, managing, and executing flow plans that consume decision tables (e.g., decision tables shown in FIGS. 4-9) in a low code/no code, natural language process automation environment on aPaaS platform 310. Detailed configuration of flow plan development platform 370 is provided below in connection with FIGS. 13-18. FIG. 13 is a schematic diagram of an embodiment of flow plan development platform 370 for creating, modifying, managing, and executing flow plans that act as consumers of decision tables. Flow plan development platform 370 may separate out the user experience in creating the design-time flow plan from the run-time considerations of storing and executing the run-time flow plan. Unlike enterprise rule engine 340 where a user creating an enterprise rule that consumes a decision table may be required to drop into script for advanced configurations for trigger elements, action elements, decision action elements, and/or decision answer action elements, flow plan development platform 370 uses flow designer system 1302 that allows the user to create, modify, and manage flow plans in a low code/no code, natural language process automation environment, without having to drop into script. This interactive and easy-to-use user interface may allow even non-IT users with little or no programming knowledge to effortlessly configure and setup flow plans that implement complex process logic for consumed policy logic incorporated via decision tables, in an interactive and intuitive user interface. In particular, flow plan development platform 370 uses flow designer system 1302 to create the design-time flow plan using database structures, and the flow engines 1314 and 1318 are configured to have no knowledge of the database structure of the design-time flow plans and/or actions (e.g., action elements, decision action elements) designed with flow designer system 1302. Flow engines 1314 and 1318 may execute a run-time version of the design-time flow plan, which in one embodiment are compiled JSON documents built via flow plan builder API 1312. Client devices, such as client devices 104A-C shown in FIG. 1 and remote client device 305 shown in FIG. 3, are able to call flow plan builder API 1312 to construct the JSON documents and may not need to adhere to any specific rules about how, where, or even whether, to store definitions within the JSON documents. Additionally, by having the database representation of the design-time flow plan separate from the run-time flow plan, flow engine 1318 can be implemented on MID server 1303 using the same engine code base as being executed on a server instance. The run-time flow is constructed from operations with data dependencies between each of the operations. Flow engines 1314 and 1318 may be able to execute the operation such that the data dependencies are met along with any explicit execution order dependencies. The details of how any given operation performs or executes its functions are abstracted away from flow engines 1314 and 1318.

In one embodiment, flow designer system 1302 may implemented using a Java®-based client device that would construct the design-time flow plan that consumes a decision table and request flow engines 1314 and/or 1318 to run the design-time flow plan. The user could build a series of actions (e.g., action elements, decision action elements, decision answer action element, and the like) and variable bindings and chain them together into a (design-time) flow plan. How the user constructs the design-time flow plan can be entirely up to the user. For example, a design-time flow plan can be metadata driven or it can be hard-coded. Once flow plan development platform 370 constructs and generates the design-time flow plan, the user can choose to save it for future execution, or simply pass the design-time flow plan to flow engines 1314 and/or 1318 for immediate execution. For purposes of this disclosure, flow designer system 1302 can also be generally referred to as and may be considered synonymous with the term "flow designer."

Creating a flow plan may involve defining what and how a flow plan performs an automated function (e.g., consume a decision table and perform set actions for different flow paths). To create a flow plan, flow designer system 1302 may include flow plan designer user interface 1306 and action designer user interface 1304. In one embodiment, flow designer user interface 1306 and action designer user interface 1304 may be located on a client device that receives user input. Flow plan designer user interface 1306 presents to a user actions (e.g., action elements, decision action elements) and triggers (e.g., trigger elements, decision trigger element) to construct design-time flow plans. A user may be able to create the design-time flow plan based on employing a general pattern of when one or more specified conditions or events occur (e.g., trigger element activated), perform one or more of the following actions (e.g., action elements). In other words, a user can create a design-time flow plan via flow plan designer user interface 1306 by specifying one or more triggers (e.g., trigger elements, decision trigger elements) for a design-time flow plan and one or more actions (e.g., decision action elements) that follow in response to the triggers. For example, a user may create a design-time flow plan that consumes the Priority Calculation decision table shown in FIGS. 4-6 for an enterprise operation that triggers when an incident record is created in an Incident table (e.g., incident created that meets certain filter conditions). Creation of the incident record may result in activation of the flow plan and, for example, execution of a decision action element that sets a particular field value of the created incident record to one of the plurality of decision answers (e.g., Critical, High, Moderate, Low, Planning, shown in FIG. 6) of the decision table based on a decision answer returned by the Priority Calculation decision table in response to given values for decision inputs passed to the decision table. Exemplary embodiments of flow plan designer user interface 1306 for creating flow plans that consume decision tables are described in connection with FIGS. 20-22. The execution of the decision action element can use some of the data from the triggering event (e.g., trigger element), which in this example would be the creation of the incident record, as an input signature (e.g., decision inputs of current values for Impact and Urgency 430, 440 in FIG. 4) for the created decision action element. The decision action element would pass the decision inputs to the underlying decision table via a corresponding API and receive in response, one of the decision answers (or a default answer) corresponding to the decision table based on which the field value may be set (or other action taken). The design-time flow plan could also include other action elements, decision action elements, or decision answer action elements (e.g., send a Slack message when the returned decision answer is Critical and when the incident record is created by a user belonging to the VIP user group) with other input signatures.

Action designer user interface 1304 allows the user to construct customizable actions (e.g., action elements, decision action element, decision answer action elements, default decision answer action element) within the design-time flow plan using action steps. Each action within the design-time flow plan can include one or more action steps. In one embodiment, each action step includes a configured action step template that specifies the operation to perform, defines the input and output data signatures for the action step, and what data values to pass to other action steps in the design-time flow plan. The input signatures for the action step can be a fixed value, registered as an observer of one of a previous action step's output, left unset, or combinations thereof. The action step may provide the input signature to the operation to produce an output data signature. The action step can then be configured to pass the output data signature to one or more other actions steps within the same action and/or other actions (e.g., action elements, decision action element, decision answer action elements) within the design-time flow plan.

FIG. 13 also depicts that flow designer system 1302 includes web service API 1308, such as a REST API, to interface with a configuration management database (CMDB) that creates data model 1310 representative of the design-time flow plan. As flow plan designer user interface 1306 and action designer user interface 1304 receive user inputs relating to creation of the design-time flow plan, flow plan designer user interface 1306 and/or action designer user interface 1304 may call web service API 1308, which may also be part of flow designer system 1302, to drive data model 1310 for the design-time flow plan. The data model 1310 acts as a database structure that defines the design-time flow plan as a user continuously modifies the design-time flow plan. In one embodiment, once a user is done modifying the design-time flow plan, the user via flow plan designer user interface 1306 and/or the action designer user interface 1304 can save the design-time flow plan for later execution or provide instructions to publish the design-time flow plan.

When the user provides instructions to publish the design-time flow plan, data model 1310 goes through a compilation process by a calling flow plan builder API 1312. For purposes of this disclosure, flow plan builder API 1312 can also be generally referred to as "flow plan builder." In one embodiment, flow plan development platform 370 provides flow plan builder API 1312 to convert the design-time flow plan represented by data model 1310 into a run-time flow plan, for example, a JSON document. In particular, flow plan builder API 1312 provides a structure to add action steps to actions elements and action elements to the flow plan. Each of the action step or action element within the created flow plan has an input and output signature. Inputs can be fixed values (e.g., hard coded) or set to observe a previous step or element output. An example layout of a design-time flow plan and a run-time flow plan are shown and discussed in more detail in FIG. 14.

Design-time flow plans may not be executed by flow engines 1314 and 1318 until a user instructs a client device to publish the design-time flow plan. In one embodiment, publishing the design-time flow plan causes flow plan development platform 370 to activate the design-time flow plan by reading data model 1310 using a glide-flow-service, call the flow plan builder API 1312 to convert (e.g., compile) data model 1310, and store the generated run-time flow plan. In one embodiment, the run-time flow plan is stored as a JSON string in a trigger table. The specified type of trigger for the design-time flow plan may also determine what other records the compilation process creates to instantiate and execute an instantiation of the run-time flow plan. Flow engines 1314 and 1318 execute the run-time flow plan (e.g., JSON document) once one or more conditions or events occur that satisfy the trigger (e.g., trigger element). During execution of the run-time flow plan, flow engines 1314 and 1318 annotate run-time state information to determine whether operations within the run-time flow plan are ready to run. An operation within a run-time flow plan is ready to run when its input values are ready and the flow engine has completed any predecessor operations.

In one embodiment, when de-serialized from JSON, the run-time flow plan is composed of OpDatum objects that hold input values and output values, operation class references, execution state, application scope, and ancestor and predecessor operation references. Flow engines 1314 and 1318 execute the operations as they are ready. An operation within the run-time flow may be ready when all its input values report ready and the operations predecessors have completed. To execute the operation, flow engines 1314 and 1318 call the execute method of the operation class. This sets the specified application scope and then calls the abstract run method. As the various run methods update the output values, registered input values' observers are automatically notified. If there are no exceptions thrown, the operation is marked as having been completed. This process continues while there are ready operations. Once flow engine 1314 completes execution of the run-time flow plan, whether because flow engine 1314 has completed all operations, or because flow engine 1314 is waiting for external events, the run-time flow plan serializes into a context record.

FIG. 14 is an illustration that maps the relationship between a design-time flow plan 1400 and a run-time flow plan 1402. FIG. 14's depiction of the design-time flow plan 1400 is a graphical representation of a data model prior to compilation. Recall the design-time flow plan 1400 can be created using an aPaaaS platform's flow designer system that drives the data model representation of the design-time flow plan 1400. As shown in FIG. 14, the design-time flow plan 1400 may include trigger element 1404 and flow element 1408. Flow element 1408 includes a plurality of action elements 1412 (e.g., decision action element), where each action element 1412 includes action step elements 1414. The action element 1412 may be considered an abstraction boundary that is generally defined in domain terms and the action step elements are typically defined in application platform based specific terms, such as a script and/or create, read, update and delete (CRUD) operations on a specific data structure. Trigger element 1404, action elements 1412 and action step elements 1414 can be customized, modified, and updated using the flow designer system. For example, a user may select when the design-time flow plan 1400 should execute by selecting and configuring the trigger element 1404.

Based on user inputs and instructions, the flow designer system is able link input values within an input signature 1428 of a given element (e.g., trigger element 1404, flow element 1408, action elements 1412, and action step elements 1414) with output values within an output signature 1426 of other elements and/or input values of an element located within the given element. The linking between the input values and output values create an observer and observable relationship between the different elements. For example, input values for one or more action step elements 1414 located within the given action element 1412 can observe a given action element's 1412 input values. By linking the input values of a given element to output values of other component elements, a user is able to create a serializable run-time flow plan 1402 during execution. In addition to having input values of a given element register as an observer of input values and/or output values of previous elements, the input signature of the given element register could include input values that have fixed values (e.g., hard coded), are left unset, or combinations thereof. Similar observer and observable relationships between input values and output values can also be established in case of action element 1412 being a decision action element that has multiple decision action paths and respective corresponding action elements 1412 and action step elements 1414 for each decision action path of design-time flow plan 1400.

FIG. 14 depicts that trigger element 1404 includes an output signature 1426, and flow element 1408, action elements 1412, and action step elements 1414 include both input signatures 1428 and output signatures 1426. Trigger element's 1404 output signature 1426 links to flow element's 1408 input signature 1428. Flow element's 1408 input signature 1428 then becomes action element's 1412a input signature 1428, which then is linked to action step element's 1414a input signature 1428. Action step element 1414b's input signature 1428 then observes action step element's 1414a output signature 1426. Action step 1414b's output signature 1426 subsequently links to action element 1412a's output signature 1426. Action element's 1412b input signature 1428 then observes action element's 1412a output signature 1426. In FIG. 14, input signatures 1428 and output signatures 1426 for action step elements 1414c and 1414d located within action element 1412b follow a similar observer/observable relationship as described for action step elements 1414a and 1414b. Action element's 1412b output signature 1426 is then linked to the flow element's 1408 output signature 1426.

Once a user is done creating and/or modifying design-time flow plan 1400, a user may provide instructions to publish design-time flow plan 1400 via the flow designer system. In response to receiving the publish instructions, flow plan development platform's 370 flow builder API 1312 converts (e.g., compiles) design-time flow plan 1400 to generate run-time flow plan 1402. Flow builder API 1312 provides a structure to add action step elements 1414 to action elements 1412 and action elements 1412 to flow element 1408. In one embodiment, as flow builder API 1312 adds action step elements 1414 into an action element 1412, the flow builder API coverts the action step component 1414 into an OpDatum record in the run-time flow plan's 1402 action 1434. As the flow builder API adds an action element 1412 to the flow element 1408, action element's 1412 operation plans are added to flow operation 1410.

FIG. 14 illustrates the resulting run-time flow plan 1402 after compiling design-time flow plan 1400. In FIG. 14, run-time flow plan 1402 includes a trigger operation 1406 and flow plan operation 1410. The trigger operation 1406 can include a responder that executes flow plan operation 1410 stored with the trigger operation 1406. Examples of types of trigger operations 1406 include a record watcher trigger created to execute flow plan operation 1410 for a record that meets specific conditions, scheduled triggers created to execute flow plan operation 1410 periodically or once at a specific time, and REST triggers created to execute flow plan operation 1410 in response to inbound REST requests. Other embodiments of design-time flow plan 1400 and corresponding run-time flow plan 1402 can include other types of triggers.

Flow plan operation 1410 includes a serializable set of operations 1416, 1418, 1420, 1422, and 1424, where each operation includes input signatures 1430 and output signatures 1432. As shown in FIG. 14, the flow plan operation 1410 includes flow start directive operation 1416 that contains the input signature 1430 of the flow plan operation 1410, which observes the trigger operation's output signature 1432. Similarly, the flow plan operation 1410 includes a flow end directive operation 1424 that hosts the output signature 1432 for flow plan operation 1410. A flow engine that executes the flow plan operation 1410 may minimize database operations within a CMDB to a read operation corresponding to flow start directive operation 1416 and a write operation corresponding to flow end directive operation 1424. When executing the flow plan operation 1410, the flow engine can avoid other database operations within the CMDB, such as managing a global state.

Each action 1434 likewise gets an action start directive operation 1418 and action end directive operation 1422. Recall that when creating the design-time flow plan 1400, a user may map the input signatures 1428 of the action elements 1412 from the flow element 1408 or from other action elements 1412. Similarly, flow start directive operation 1416, action start directive operation 1418, and/or end directive operations 1422 provide a structure in the flow plan operation 1410 for the mapping of input signatures 1430. Within an action 1434, each action step operation 1420 may become a single operation. The action step operation 1420 may have its inputs values mapped from the action's 1434 input signature, which is hosted on the action start directive operation 1418, or from a predecessor action step operation 1420. As shown in FIG. 14, input values within input signatures 1430 may reference output values found within output signatures 1432.

Although FIG. 14 illustrates specific embodiments of design-time flow plan 1400 and run-time flow plan 1402 that arranges actions (e.g., action element 1412A and action 1434) in a linear sequence, the disclosure is not limited to the specific embodiments illustrated in FIG. 14. For example, other embodiments of design-time flow plan 1400 and run-time flow plan 1402 could include branching, looping, and/or parallel execution semantics. For example, when action element 1412A or action 1434 corresponds to a decision action element that consumes an external decision table within the flow plan, branching semantics for the various decision flow paths corresponding to the various decision answers returnable by the decision table may be implemented and corresponding action elements 1412A and actions 1434 (i.e., decision answer action elements for various decision answers) may be executed in a branched manner in flow element 1408 and flow operation 1410. Stated another way, the design-time flow plan 1400 and a run-time flow plan 1402 may be configured to include dynamic mutation operations that dynamically create actions and/or operations that execute repeatable operations over sets of data and/or while a condition state exists. Moreover, the design-time flow plan 1400 and a run-time flow plan 1402 may be configured to include condition logic (e.g., decision action elements and decision action flow paths) that optionally executes actions and/or operations based upon a condition state. The use and discussion of FIG. 14 is only an example to facilitate ease of description and explanation and are not intended to limit the disclosure to the specific examples.

Figure 15:
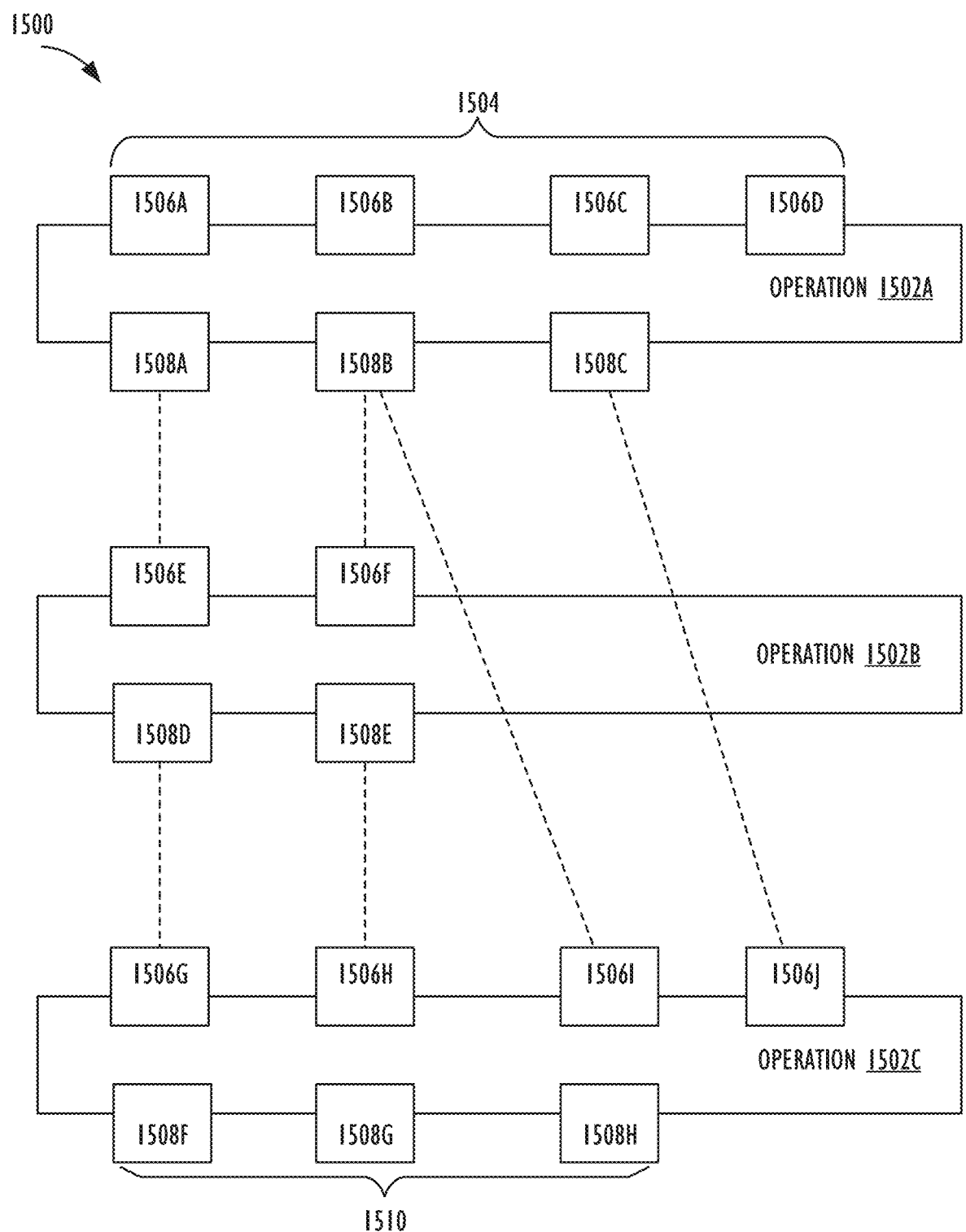
FIG. 15 illustrates a serializable set of operations that corresponds to a portion of a run-time flow plan.

FIG. 15 illustrates a serializable set of operations 1502a-1502c that corresponds to a portion of a run-time flow plan 1500. For example and in reference to FIG. 14, operation 1502a can correspond to an action start directive operation 1418 and operations 1502b and 1502c correspond to action step operations 1420. In another example and in reference to FIG. 14, operations 1502a-1502c could correspond to action step operations 420. FIG. 15 depicts that each operation 1502a-1502c in the run-time flow plan 1500 has an input signature 1504 and output signature 1510. The input signature 1504 includes input values 1506a-1506j and the output signatures 1510 include output values 1508a-1508h. The input values 1506a-1506j and output values 1508a-1508h are linked together to implement a serializable, observer/observable relationship between the operations 1502a-1502c. As operations 1502a-1502c complete and populate their output values 1508a-1508h with data, the output values 1508a-1508h will notify all of its registered observer input values 1506a-1506j. When a flow engine queries the input values 1506a-1506j as to their status, the input values 1506a-1506j will report that they are not ready if the input values 1506a-1506j have not been notified of their value by their registered observable output values 1508a-1508h. If the input values 1506a-1506j have been notified, or are not observing anything, the input values 1506a-1506j report as ready.

As a serializable set of operations, operations 1502a-1502c are unable to execute until their observer input values 1506 have been notified of their value and/or any predecessor operations 1502 have been completed. As shown in FIG. 15, operation 1502a may include an input signature 1504a that includes four input values 1506a-1506d and an output signature 1510a with three output values 1508a-1508c;

operation 1502b may include an input signature 1504b that includes two input values 1506e and 1506f and an output signature 1510b with two output values 1508d and 1508e; and operation 1502c may include an input signature 1504c that includes four input values 1506g-1506j and an output signature 1510c with three output values 1508f-1508h. In response to operation 1502a receiving and/or being notified of input values 1506a-1506d are ready, operation 1502a executes to produce output values 1508a-1508c. Input values 1506e and 1506f of operation 1502b observes the output values 1508a and 1508b, respectively, and input values 1506i and 1506j of operation 1502c observes the output values 1508b and 1508c, respectively. Once operation 1502a finishes execution, operation 1502b's input values 1506e and 1506f are ready and operation 1502b is then able to execute to produce the two output values 1508d and 1508e. The input values 1506g and 1506h from operation 1502c observe the two output values 1508d and 1508e. After operation 1502b executes and notifies operation 1502c that input values 1506g and 1506h are ready and operation 1502a executes and notifies operation 1502c input values 1506i and 1506j are ready, operation 1502c executes to produce output values 1508f-1508h.

Figure 16:
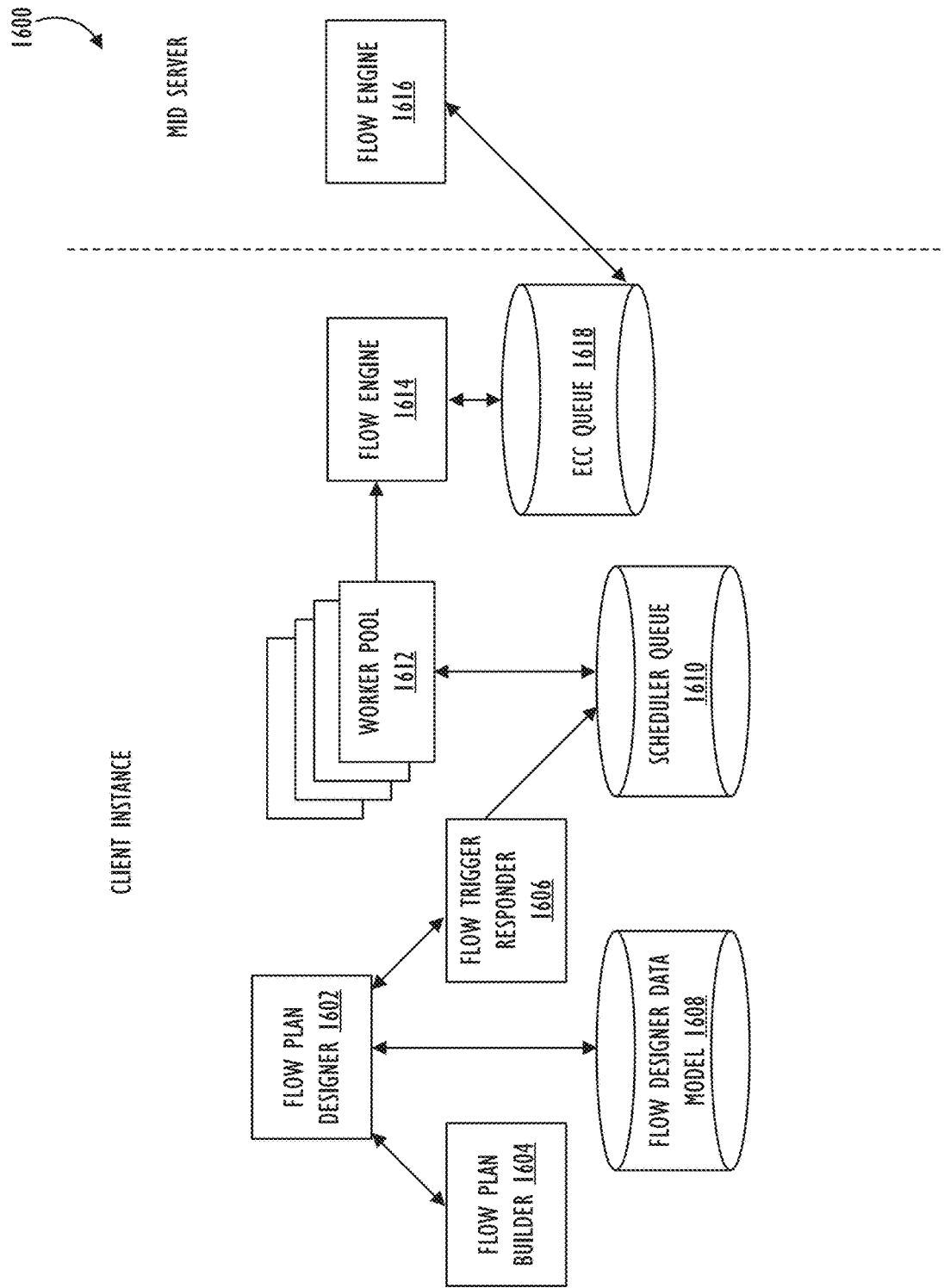
FIG. 16 is a block diagram of another embodiment of an automation system of the flow plan development platform for creating, modifying, managing, and executing a flow plan that consumes a decision table.

FIG. 16 is a schematic diagram of another embodiment of flow plan development platform 1600 for creating, modifying, managing, and executing flow plans that consume decision tables. Flow plan designer 1602, flow plan builder 1604, and flow designer data model 1608 are similar to FIG. 13's flow designer system 1302, flow plan builder API 1312, and data model 1310, respectively. As discussed above in FIG. 13, flow plan designer 1602 can include one or more user interfaces for a user to create, customize, modify, and update a design-time flow plan. Flow plan designer 1602 drives flow designer data model 1608, which defines the design-time flow plan. Once a user instructs flow plan designer 1602 to publish and activate the design-time flow plan, flow plan designer 1602 reads (e.g., using a glide-flow-service) flow designer data model 1608 and calls flow plan builder 1604 to convert the design-time flow plan to a run-time flow plan. Recall that as discussed in FIG. 14, the run-time flow plan may include a trigger operation (corresponding to trigger element) and a flow plan operation (corresponding to flow element (and including one or more action elements)).

Once flow plan builder 1604 generates the run-time flow plan, flow plan designer 1602 may send the trigger operation information associated with the run-time flow plan to a trigger responder 1606. Trigger responder 1606 monitors whether a computing operation satisfies one or more conditions or events specified by the trigger operation information. When the trigger responder 1606 fires, the trigger responder 1606 inserts a scheduled job for the run-time flow plan into a scheduler queue 1610. Once the schedule job make its way through the scheduler queue 1610, worker pool 1612 may assign one or more existing worker threads for the flow engine 1614 to execute the run-time flow plan. In one embodiment, flow engine 1614 may use multiple worker threads to support execution of actions within the run-time flow plan. Having the trigger responder 1606 insert a scheduled job within the scheduler queue 1610 and subsequently assigning worker threads from worker pool 1612 can minimize performance impact and disruption when executing the run-time flow plan. For example, the different actions (e.g., action elements) for the run-time flow plan may run asynchronously from a main thread, and thus not block the main thread when running long operations for the run-time flow plan.

FIG. 16 illustrates that a flow engine 1614 and a flow engine 1616 can be implemented on both client instance (e.g., client instance 315 in FIG. 3) and MID server (e.g., MID server 107 in FIG. 1), respectively. For flow engine 1616 to execute an action element of a run-time flow plan on the MID server, the flow plan builder 1604 generates a run-time flow plan that includes two action start directive operations and two action end directive operations. Using FIG. 14 as an example, instead of having the action 1434 include a single set of an action start directive operation 1418 and action end directive operation 1422, the action 1434 can instead include two pairs of action start directive operations 1418 and action end directive operations 1422. In one embodiment, the second pair of action start directive operation 1418 and action end directive operation 1422 may be located between the first pair of action start directive operation 1418 and action end directive operation 1422. When the flow engine 1614 executes the first action start directive operation 1418 within a run-time flow plan, the flow engine 1614 propagates inputs for the second action start directive operation's 1418 input signature. Once flow engine 1614 propagates the input, the flow engine 1614 can package all of the operations (e.g., action step operations) between the second action start directive operation 1418 and action end directive operation 1422 and forward the packaged operations to the External Communication Channel (ECC) queue 1618. The ECC queue 1618 then forwards the package operations as an ECC queue message to the MID server.

In one embodiment, the ECC queue 1618 is a database table that is normally queried, updated, and inserted into by other computing system operating outside the client instance. Each record in the ECC queue 1618 may be a message, either from the client instance (e.g., flow engine 1614) to some other system or from the other system to the client instance. The ECC queue 1618 can act as a connection point (though not the only possible one) between the client instance and other systems that integrate with it. As shown in FIG. 16, the ECC queue also acts as the connection between the customer instance and the MID server. As such, although FIG. 16 illustrates that the flow engine 1616 is located on the MID server, other embodiments could have the flow engine 1616 located on another remote computing system.

After MID server receives the ECC queue message, the flow engine 1616 executes the received portion of the run-time flow plan. By doing so, the flow plan development platform 1600 is able to offload the execution of the run-time flow plan to the MID server in situations where the client instance is unable to perform certain operations within the flow plan and/or would require too much computational resources. Once the flow engine 1616 completes the execution of the received portion of the run-time flow plan, the flow engine 1616 bundles and transmits its context records (e.g., run-time state information and/or other flow plan records) back to the ECC queue 1618, which then forwards the received context records to the flow engine 1616. Flow engine 1616 may use the received context records to update the flow engine's 1616 run-time state information and resume executing operations based on the received context records. When flow engine 1616 is done executing the run-time flow plan, either because the flow engine 1616 has completed all operations or because it is waiting for external events, the run-time flow plan serializes to a context record.

Figure 17:
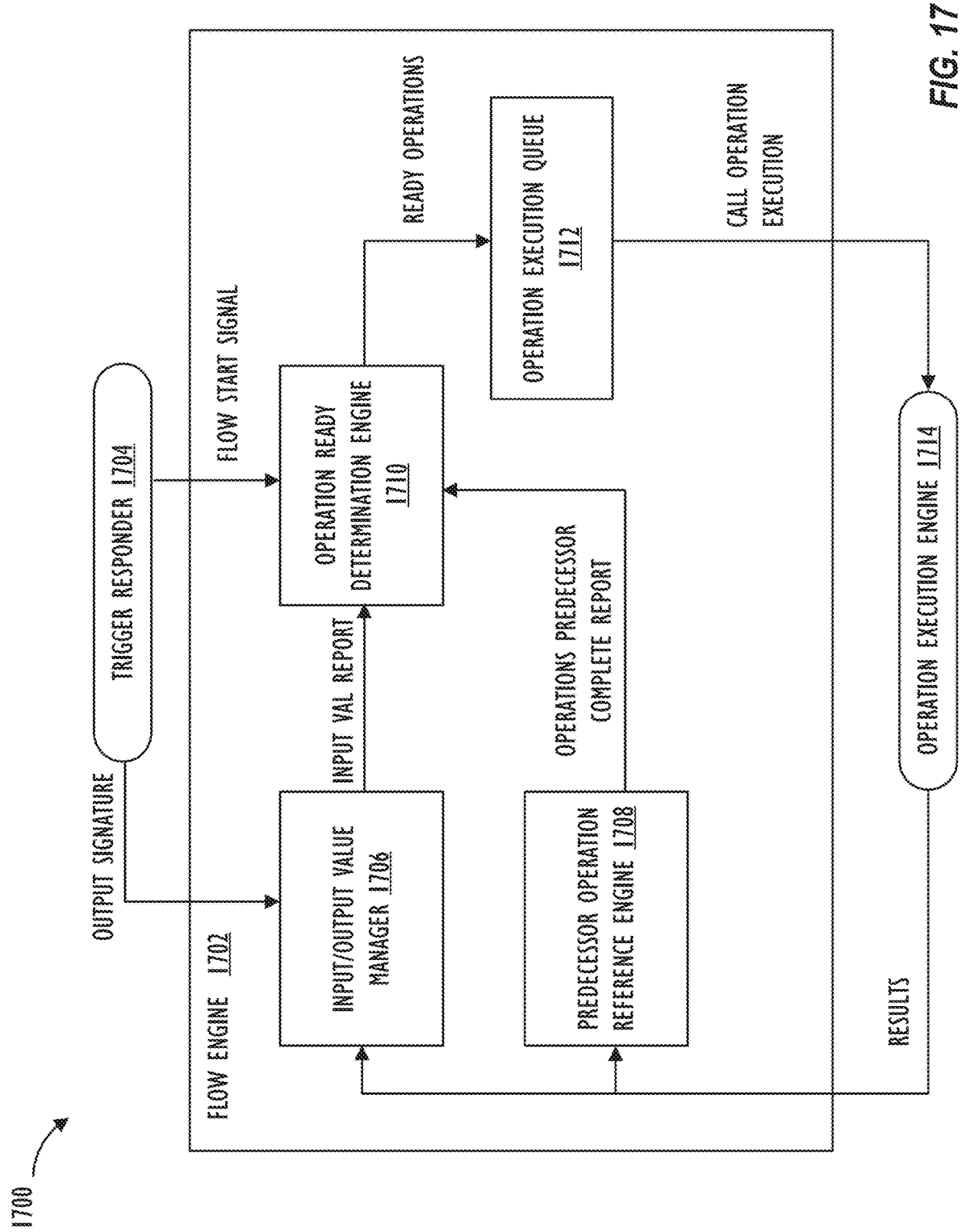
FIG. 17 is a schematic diagram of an embodiment of a flow engine for executing run-time flow plans.

FIG. 17 is a schematic diagram of an embodiment of flow engine 1702 for executing run-time flow plans. As shown in FIG. 17, trigger responder 1704, which is similar to trigger responder 1606 shown in FIG. 16, detects that one or more conditions or events satisfy a trigger for a run-time flow plan. The trigger responder 1704 can send its output signature and a flow start signal to the flow engine 1702. Specifically, flow engine's 1702 input/output value manager 1706 receives the output signature from the trigger responder 1704 and the operation ready determination engine 1710 receives the flow start signal. Input/output value manager 1706 maps and manages the observer/observable relationship for the different operations within the run-time flow plan. For example, the input/output value manager 1706 may be aware of the input and output data signatures for each action step operation and what values to pass to other action step operation within the run-time flow plan. Based on the observer/observable relationship information, the input/output value manager 1706 uses the output signature from the trigger responder 1704 and/or other executed operations to generate an input value report that indicates which operations' input values are ready. As shown in FIG. 17, the input/output value manager 1706 provides the input value report to the operation ready determination engine 1710 for further evaluation.

Once the operation ready determination engine 1710 receives the flow start signal from the trigger responder 1704, the operation ready determination engine 1710 begins to evaluate which operations are ready to run. FIG. 17 depicts that the operation ready determination engine 1710 receives the input value report that indicates which operation's input values are ready and receives an operations predecessor complete report that indicates which predecessor operations have been completed. The operation ready determination engine 1710 then uses the input value report and operations predecessor complete report to evaluate which operations are ready for execution. Rather than using a shared global state to determine the exact order of operation, the operation ready determination engine 1710 is able to determine whether an operation is ready to run when its input values are ready and the flow engine has completed any predecessor operations. In other words, the flow engine 1702 does not drive, coordinate, or manage when each operations should execute, but instead simplifies the evaluation process by detecting whether each operation's execution state have been met.

After the operation ready determination engine 1710 determines which operations are ready for execution, the operation ready determination engine 1710 sends the ready operation into an operation execution queue 1712. At this point, the operation execution queue 1712 may determine whether to execute one or more of the ready operations in a parallel or sequential fashion, or in a branched fashion in case of, for example, decision action elements or trigger action elements. To execute the ready operations, the operation execute queue 1712 may call the operation execution engine 1714 that executes the ready operation using one or more worker threads. The results of the operation execution 1714 are then sent back to the input/output value manager 1706 and predecessor operation reference engine 1708 to update and annotate the run-time state information for the run-time flow plan.

Figure 18:
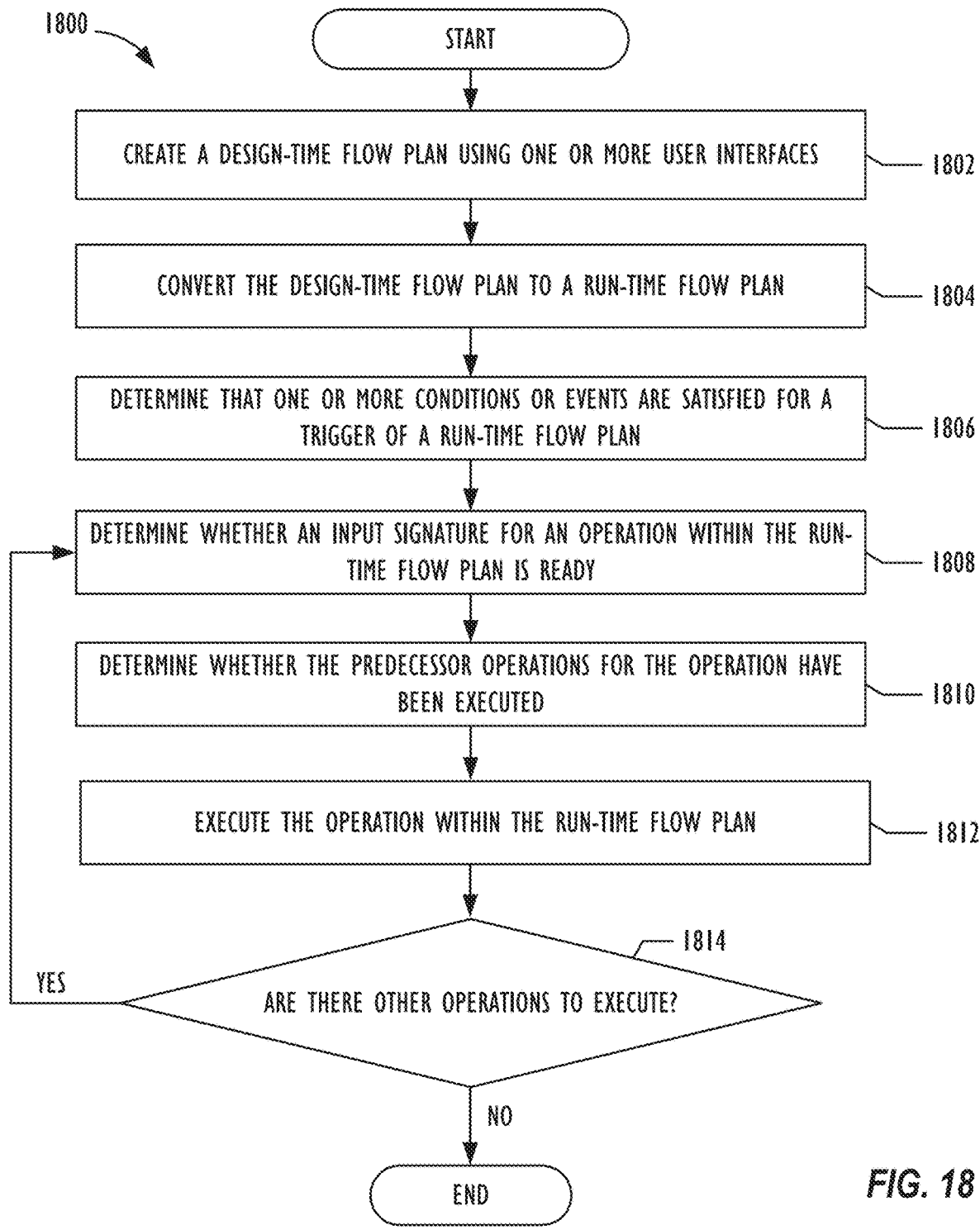
FIG. 18 is a flowchart of an embodiment of a method that creates and executes a flow plan that consumes a decision table.

FIG. 18 is a flowchart of an embodiment of method 1800 that creates and executes a flow plan that consumes a decision table. Method 1800 may create and execute flows using hardware, software, or both. Using FIG. 13 as an example, method 1800 may be implemented using flow plan development platform 370, where the flow designer system 1302 creates the design-time flow plan, the flow plan builder API 1312 converts the design-time flow plan to a run-time flow plan, and the flow engine executes the run-time flow plan. In one embodiment, method 1800 may be implemented on a flow engine located in a client instance. In another embodiment, method 1800 may be implemented on a two separate flow engines, one located on a client instance and another located on another remote computing system, such as a MID server. Although FIG. 18 illustrates that the blocks of method 1800 are implemented in a sequential operation, other embodiments of method 1800 may have two or more blocks implemented in parallel operations. Further, in one or more embodiments, not all blocks may need to be implemented to create and execute a flow plan.

Method 1800 may start at block 1802 to create a design-time flow plan using one or more user interfaces. As discussed in FIGS. 13 and 16, the user interfaces allow a user to create an design-time flow plan that consumes a decision table and drive a data model that represents the design-time flow plan. Method 1800 may then move to block 1804 to convert (e.g. compile) the design-time flow plan to a run-time flow plan. Method 1800 may not convert the design-time flow plan to the run-time flow plan until an instruction to publish the design-time flow plan is received as input from a user. Once a user provides instructions via the user interfaces to publish the design-time flow plan, method 1800 may use a flow plan builder for the conversion. From block 1804, method 1800 may continue to block 1806 to determine that one or more conditions or events are satisfied for a trigger (e.g., trigger element) of the run-time flow plan.

Once a run-time flow plan is triggered for execution, method 1800 may then move to block 1808 to determine whether an input signature for an operation within the run-time flow plan is ready (e.g., data required for an action or operation is available, or condition satisfied). Method 1800 may also proceed to block 1810 and determine whether the predecessor operations for the operation have been executed. As discussed above, operations within a run-time flow plan do not execute until the input values for the input signature are ready and/or any predecessor operations have finished executing. After determining that the input signatures are ready and predecessor operations have finished executing, method 1800 may then move to block 1812 to execute the operation within the run-time flow plan. Method 1800 can then proceed to block 1814 to determine whether other operations remain to be executed within the run-time flow plan. If no other operations remain to be executed, method 1800 ends; otherwise, method 1800 returns back to block 1808.

Figure 19:
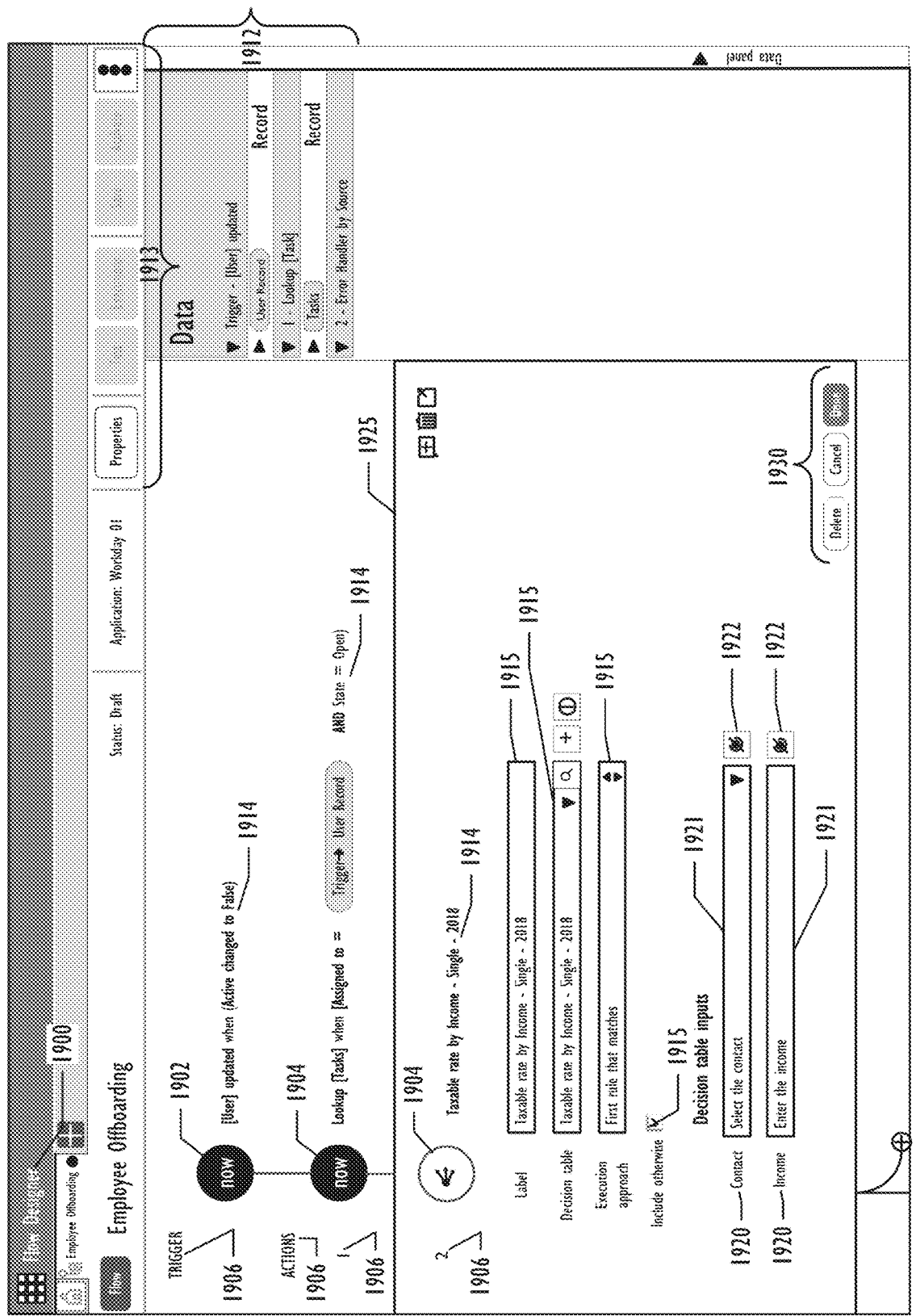
FIG. 19 illustrates an embodiment of a design-time flow plan a user can create with a flow plan designer user interface to consume a decision table.
Figure 20:
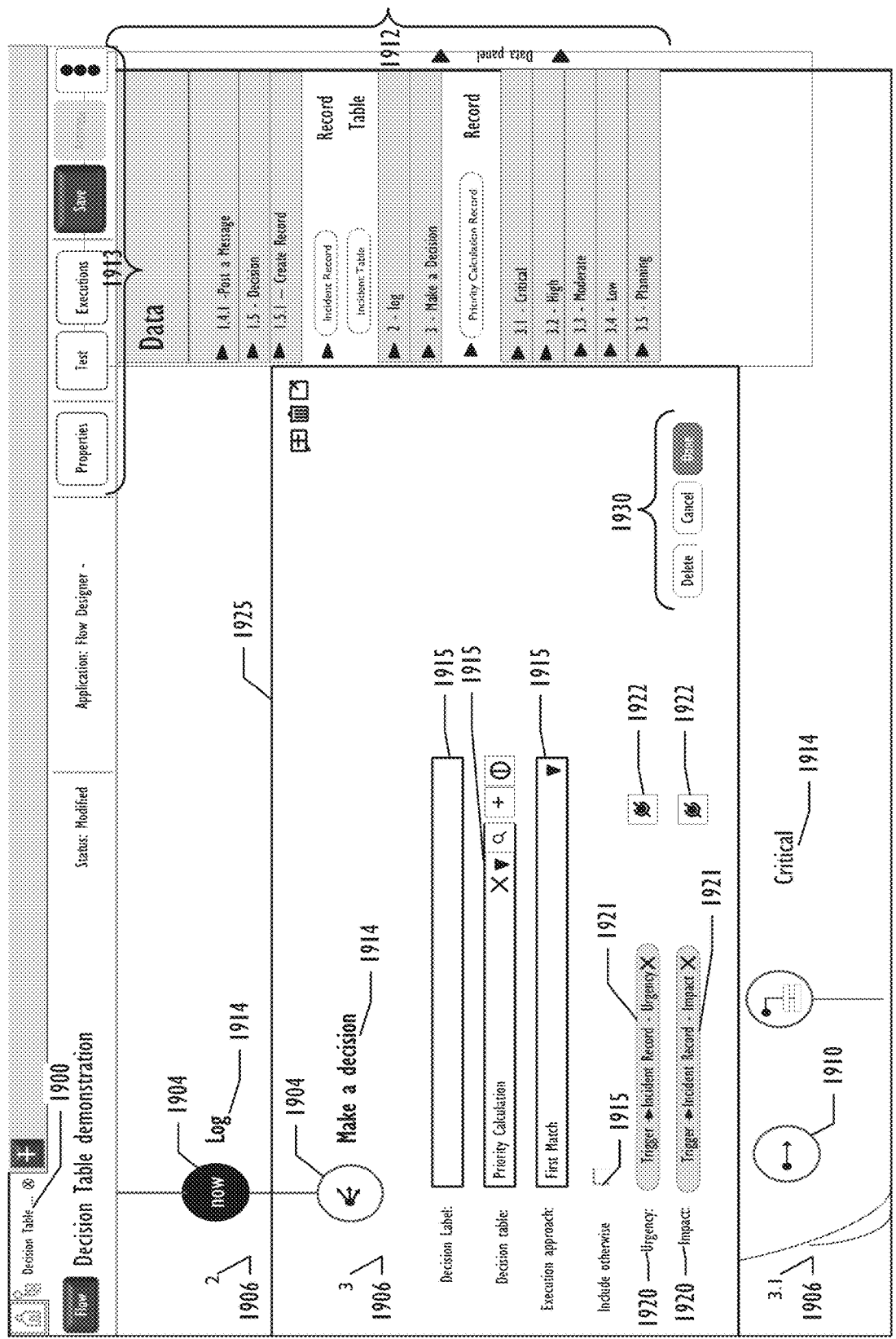
FIG. 20 illustrates another embodiment of a design-time flow plan a user can create with a flow plan designer user interface to consume a decision table.
Figure 21:
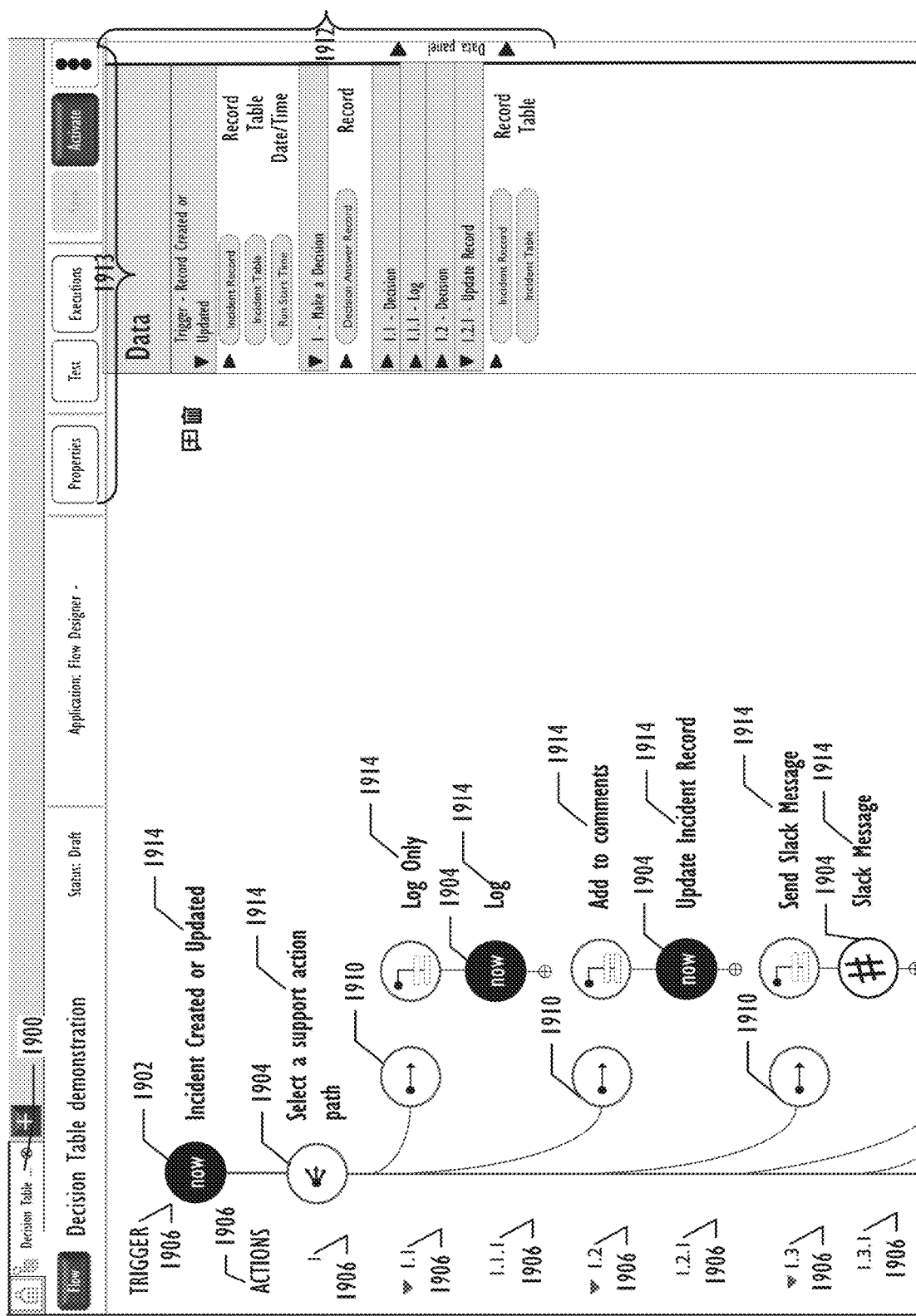
FIG. 21 illustrates another embodiment of a design-time flow plan a user can create with a flow plan designer user interface to consume a decision table.

FIGS. 19-21 illustrate embodiments of design-time flow plans that a user is able to create with flow plan designer user interface 1900 (or flow plan designer user interface 1306 of FIG. 13, or flow plan designer 1602 of FIG. 16) to consume decision tables. As shown in FIG. 19-21, flow plan designer user interface 1900 permits a user to create, modify, manage, and execute a human-readable version of the design-time flow plan that consumes a decision table.

In particular, flow plan designer user interface 1900 presents trigger indicator 1902 to represent the design-time flow plan's trigger element, and presents action indicators 1904 to represent the design-time flow plan's action elements (e.g., action elements, decision action elements, decision answer action elements). In one embodiment, by interacting with flow plan designer user interface 1900, the user configuring the design-time flow plan can set trigger indicator 1902 by selecting a trigger element from a guide window of pre-existing trigger elements presented to the user. As explained previously, the trigger element may be defined so as to initiate based on a CRUD operation or query operation of a record in a particular selected table, expiration of a timer, arrival of an inbound REST API call, and the like. Similarly, by interacting with flow plan designer user interface 1900, the user configuring the design-time flow plan can set one or more action indicators 1904 by selecting one or more action elements from a guide window of pre-existing action elements presented to the user for selection. Thus, the design-time flow plan can be created from pre-existing or copied action elements (e.g., action elements, decision action elements, decision answer action elements). In one or more embodiments, the pre-existing action elements may correspond to third party or external action elements that the automation system of the flow plan development platform may call to complete certain functions (e.g., posting a message on Microsoft® Teams; sending a Slack message, and the like). Alternately, the pre-existing action elements may correspond to operations with an internal application (e.g., logging an event, sending email, updating a record in a table, and the like).

FIGS. 19-21 also illustrate that flow designer user interface 1900 includes data panel component 1912 that summarizes the arrangement and order of the design-time flow plan, and corresponding data (e.g., field values for one or more fields or columns of the triggering record) that is available for creating the design-time flow plan. For example, in the illustrative use case shown in FIG. 19, because the trigger element (corresponding to trigger indicator 1902) is set to initiate when a record in the "User" table is updated, data corresponding to field values of various fields (or columns) of the updated user record which initiates or activates the trigger element is available for use to the design-time flow plan. The data of the various columns or fields of the updated user record is presented visually for utilization (e.g., via "drag and drop") in data panel component 1912. By creating this low code/no code, natural language process automation authoring, creating complex flow plans that take sophisticated data inputs is made more user-friendly, without requiring the process developer to drop into script.

In FIGS. 19-21, each of the indicators 1902 and 1904 may be graphical representations, such as graphics icons, where the graphic icons could differ dependent on the type of the trigger and/or action element. Using FIGS. 19-21 as an example, different graphic icons can be used for action indicators 1904 when the action element corresponds to a decision making function which acts as an integration point with a decision table (e.g., in FIGS. 19-21), and a logging function (e.g., in FIGS. 19-20). FIG. 21 also illustrates that certain action indicators 1904 have a different graphic icon when the action element (in this case, decision answer action element) is to send "Slack message" at decision answer action element 1.3.1. In this case, flow designer user interface 1900 may present a different graphic icon since decision answer action element 1.3.1 corresponds to an operation that involves communicating with a third party application and/or system outside the client instance or aPaaS platform.

FIGS. 19-21 also illustrate that text label 1906 can be located in close proximity to the different indicators 1902 and 1904 in order to improve readability of the design-time flow plan. As an example, in FIG. 21, text label 1906 above the trigger indicator 1902 presents text that specifies the trigger indicator 1902 is for a trigger element and text label 1906 above the first action indicator 1904 (in this case, a decision action element) specifies that the action indicators 1904 correspond to various action elements (or decision action elements or decision answer action elements). FIGS. 19-21 also illustrate that text label 1906 can present a numerical representation of an action element's order within the design-time flow plan. Flow designer user interface 1900 may connect and arrange indicators 1902 and 1904 based on how data routes amongst the trigger and action elements (including decision action elements and decision answer action elements). Recall, that the linking between trigger and action elements are based on what inputs an element receives from other elements and what outputs the element sends to other elements. Using FIG. 19 as an example, flow designer user interface 1900 may link trigger indicator 1902 to action indicator 1904 with text label 1906 that has the value of "1." Action indicator 1904 may then connect to a second action indicator 1904 (in this case, decision action element) that has text label 1906 with a value of "2."

FIGS. 19-21 also illustrate that flow designer user interface 1900 may include function annotations 1914 that summarize functional operations for each of the indicators 1902 and 1904 (including flow path indicators 1910 described below) for the design-time flow plan. The function annotations 1914 may vary depending on the type of trigger, and action elements a user creates. The flow designer user interface 700 may also include a menu component 1913 that includes a list of functions that a user may perform on the design-time flow plan and the ability to add pre-existing or previously saved action elements within a design-time flow plan. In FIGS. 19-21, the menu component 1913 includes menu options, such as for "properties," "test," "executions," "save," and "activate," options. Other embodiments of the menu component 1913 may include other operations, such as the "publish" option and/or a portion of the menu options shown in FIGS. 19-21.

As shown in FIGS. 19-20, when creating or modifying a design-time flow plan, flow plan designer user interface 1900 may allow a user to select as an action indicator 1904 (or trigger indicator 1902), decision action indicator (represented by a graphic icon having three arrows) 1904 that corresponds to the decision action element and that acts as an integration point for the design-time flow plan to consume a particular selected decision table from among one or more decision tables of decision table module 320. As shown in FIGS. 19-20, when the user interacts with flow plan designer user interface 1900 to select as action indicator 1904, a decision action indicator corresponding to the decision action element, flow plan designer user interface 1900 may present selection window 1925 to the user to input one or more attributes 1915 pertaining to the decision action element. Attributes 1915 that may be input by the user in selection window 1925 may include a textual Label (used as function annotation 1914) to be displayed in the design-time flow plan that summarizes functional operation of the decision action indicator 1904; selection of a particular decision table that is to be consumed by the design-time flow plan; Execution Approach; and the like. In one embodiment, flow plan designer user interface 1900 may, in selection window 1925, include a plurality of user-selectable available decision tables from a drop-down list. Once a decision table is selected by setting the one or more attributes 1915, flow plan designer user interface 1900 may be programmed to automatically obtain information corresponding to decision inputs (e.g., decision inputs 430 in FIGS. 4 and 7) the selected decision table's API is configured to accept and the plurality of decision answers returnable by the selected decision table. Flow plan designer user interface 1900 may then present the information of decision inputs of the selected decision table as one or more input fields 1920. In the example use case shown in FIG. 19, input fields 1920 for the "Taxable Rate by Income—Single—2018" Decision Table include "Contact" and "Income". Similarly, in the example use case shown in FIG. 20, input fields 1920 for the "Priority Calculation" decision table include "Urgency" and "Impact". These labels for fields 1920 may be automatically obtained by flow plan designer user interface 1900 by calling via decision table APIs 335.

Further, flow plan designer user interface 1900 may further include user-selectable trigger fields 1921 that can be set as input for input fields 1920, respectively. In one embodiment, flow plan designer user interface 1900 may further include a corresponding pill picker 1922 for each input field 1920 to set corresponding user-selectable trigger fields 1921 by presenting all available fields of data (e.g., columns of a table) for user-selection and browsing. Flow plan designer user interface 1900 may also provide a "drag-and-drop" experience for setting user-selectable trigger fields 1921 by enabling dragging of the appropriate column from data panel component 1912. In this way, in the example embodiment shown in FIG. 20, the user can select the Urgency column of the Incident table record that triggered the design-time flow plan of FIG. 20 as input field 1921 for the Urgency input field 1920 of the Priority Calculation Decision Table, and select the Impact column of the Incident table record that triggered the design-time flow plan of FIG. 20 as input field 1921 for the Impact input field 1920 of the Priority Calculation Decision Table. Then, during run-time, for example, when a new incident record is created in the Incident table, values for the Impact and urgency fields of the new record are passed as inputs to the Priority Calculation decision table by the run-time flow plan consuming the Priority Calculation decision table via decision table API 335. Flow plan designer user interface 1900 further includes operation panel 1930 so that once the user is satisfied with setting attributes 1915 and trigger inputs 1921 corresponding to the decision action indicator 1904, the user can save the action indicator 1904 as a decision action element of the design-time flow plan.

As explained above, when a decision table is selected by the user for a decision action element as an action indicator 1904, flow plan designer user interface 1900 may further be programmed to automatically obtain information corresponding to the plurality of decision answers corresponding to the selected decision table (e.g., decision answers 610 in FIGS. 6 and 9) from the selected decision table's API as a plurality of flow path indicators 1910. As illustrated in FIG. 21, flow plan designer user interface 1900 may then present this information of decision answers of the selected decision table as the plurality of flow path indicators 1910 respectively corresponding to the plurality of decision answers. The plurality of flow path indicators 1910 may also include a default flow path indicator 1910 that corresponds to action indicators or action elements to be executed when condition logic for none of the plurality of decision answers associated with the decision table is satisfied based on passed values for the decision inputs to the decision table. The default flow path may act as a "catch-all" path whose actions are to be executed when none of the decision answers are returned by the decision table. Such a dynamic decision tree configuration for a decision action element that consumes a decision table in a design-time flow plan allows the user of the flow plan designer user interface 1900 to configure different respective action indicators 1904 of decision answer action elements for the respective flow path indicators 1901.

By way of example, as shown in FIG. 21, flow plan designer user interface 1900 presents three flow path indicators 1910 (annotated as "Log Only", "Add to Comments", and "Send Slack Message") for three decision answers corresponding to the decision table being consumed by action indicator 1904 (annotated 1914 as "Select a support action path"). The user can then specify one or more action indicators 1904 corresponding to the respective flow paths defined by the three flow path indicators 1910. Flow plan designer user interface 1900 thus provides a decision tree structure where one or more actions may be performed in the flow plan depending on the decision answer returned by the decision table consumed by the flow plan. One of the flow paths can also be a default answer path that is executed as a "catch-all", when none of the other decision answers are returned by the corresponding decision table as being true for given values for the decision inputs passed to the decision table. For example, FIG. 21 shows that when the decision answer returned by the consumed decision table corresponds to the flow path indicator 1910 annotated 1914 "Log Only", the flow path is designed to execute the action element corresponding to action indicator 1904 annotated "Log" (e.g., record entry for the triggered incident in the log). When the decision answer returned by the consumed decision table corresponds to the flow path indicator 1910 annotated "Add to Comments", the flow path is designed to execute the action element corresponding to action indicator 1904 annotated "Update Incident Record". And when the decision answer returned by the consumed decision table corresponds to the flow path indicator 1910 annotated "Send Slack Message", the flow path is designed to execute the action element corresponding to action indicator 1904 annotated "Slack Message".

Recall that the condition logic that returns one of the decision answers as true is decoupled from the design-time flow plan (it is stored in the consumed decision table). The condition logic accepts as input, values based on the trigger fields 1921 and returns one of the decision answers as true to the branching logic of the decision action element (action indicator 1904). The decision action indicator 1904 then picks the correct branch or flow path 1910 based on the decision answer returned by the decision table, and executes one or more action elements (decision answer action indicators 1904) specified as corresponding to the particular flow path indicator 1910.

In the above described embodiments, the decision table that is consumed by the consumer (e.g., flow plan, enterprise rule, and the like) is implemented as a decision action element in response to a trigger element (e.g., decision trigger element) of the consumer. However, this may not necessarily be the case. In an alternate embodiment, the decision table can also be implemented as a trigger element of a consumer. The plurality of decision answers of the decision table may then be references to a series of flow objects on the aPaaS platform. Based on the decision inputs supplied to the decision table, and based on condition logic of the decision table, one of the plurality of decision answers (e.g., flow object) may then be returned to the calling routine and the flow executed depending on the returned decision answer.

Figure 22:
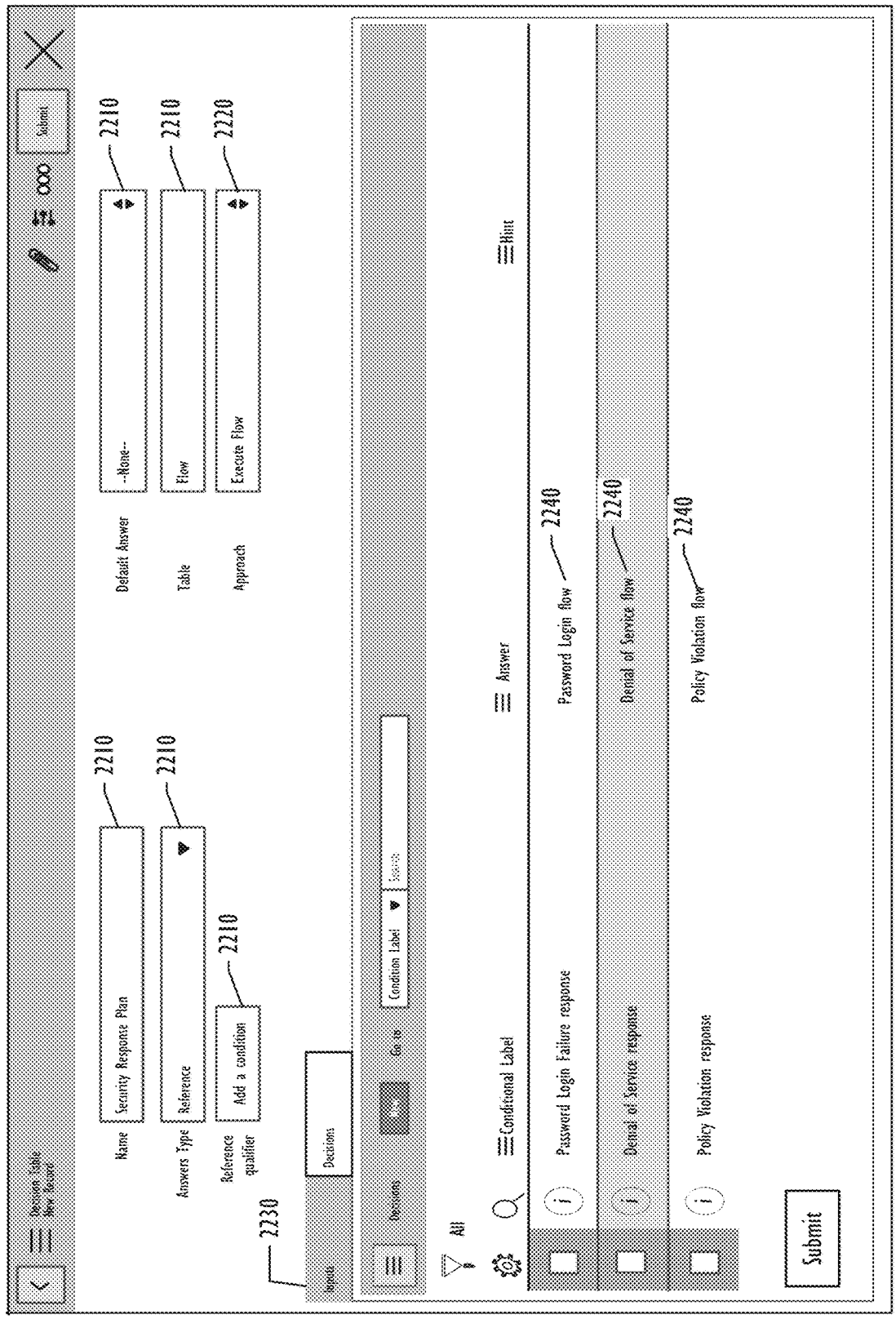
FIG. 22 illustrates another embodiment of an answer table of a decision table a user can create with the decision table user interface.

FIG. 22 illustrates an embodiment of decision table that can be implemented as a decision trigger element and that is associated with links to a plurality of flow objects as decision answers. As shown in the example use case in FIG. 22, decision table user interface 325 may permit a user to create and modify a human-readable version of the decision table pertaining to security response plan based on given values for decision inputs 2230, where the table returns a "flow object" as a decision answer. The user may provide various attributes 2210 to create and save the decision table.

For example, attributes 2210 may include decision table Name, Answer table name which stores decision answers corresponding to the decision table, default answer to be returned when condition logic of none of the decision answers is satisfied, answer type, and the like. Further, as shown in FIG. 22, the user may also set attribute 2220 (labeled "Approach") to specify implementation of the decision table as a decision trigger element that triggers one of the "flow object" decision answers based on given values for decision inputs.

As shown in FIG. 22, the user may also set one or more decision inputs 2230 (e.g., one or more fields or attributes or column names of a particular selected database table). Recall that the decision table allows the user to specify condition logic based on given values of the decision inputs 2230 to resolve to one of a plurality of decision answers. Similar condition logic may be specified by the user for each of a plurality of decision answers 2240 associated with the decision table using decision table user interface 325. As shown in FIG. 22, a plurality of decision answers 2240 (e.g., "Password login flow", "Denial of Service flow", and "Policy Violation flow") are stored in association with the decision table. Once the user is satisfied with the set decision inputs 2230, and condition logic of each of a plurality of decision answers 2240, the user may save the decision table. As shown in FIG. 22, each decision answer 2240 is a reference (e.g., pointer or path) to a flow object in any other part of the aPaaS platform. Thus, by consuming the decision table, a series of flow objects can be served-up for execution based on corresponding condition logic being determined to be true for given values of decision inputs to the decision table's API. A consumer consuming the Security Response Plan decision table shown in FIG. 22 can pass values for the requisite decision inputs to the decision table via the API, and receive in response, a reference to a flow as a decision answer. The consumer can then execute the received flow, which may include one or more trigger elements, action elements, and the like. In one embodiment, by activating the decision table shown in the embodiment of FIG. 22, a flow corresponding to a decision answer can be executed when corresponding condition logic is determined to be true based on input values for the decision inputs. That is, calling the API of the decision table would initiate the corresponding appropriate flow based on passed values for the decision inputs, and based on the decision logic that resolves to be true based on the passed values.

Figure 23:
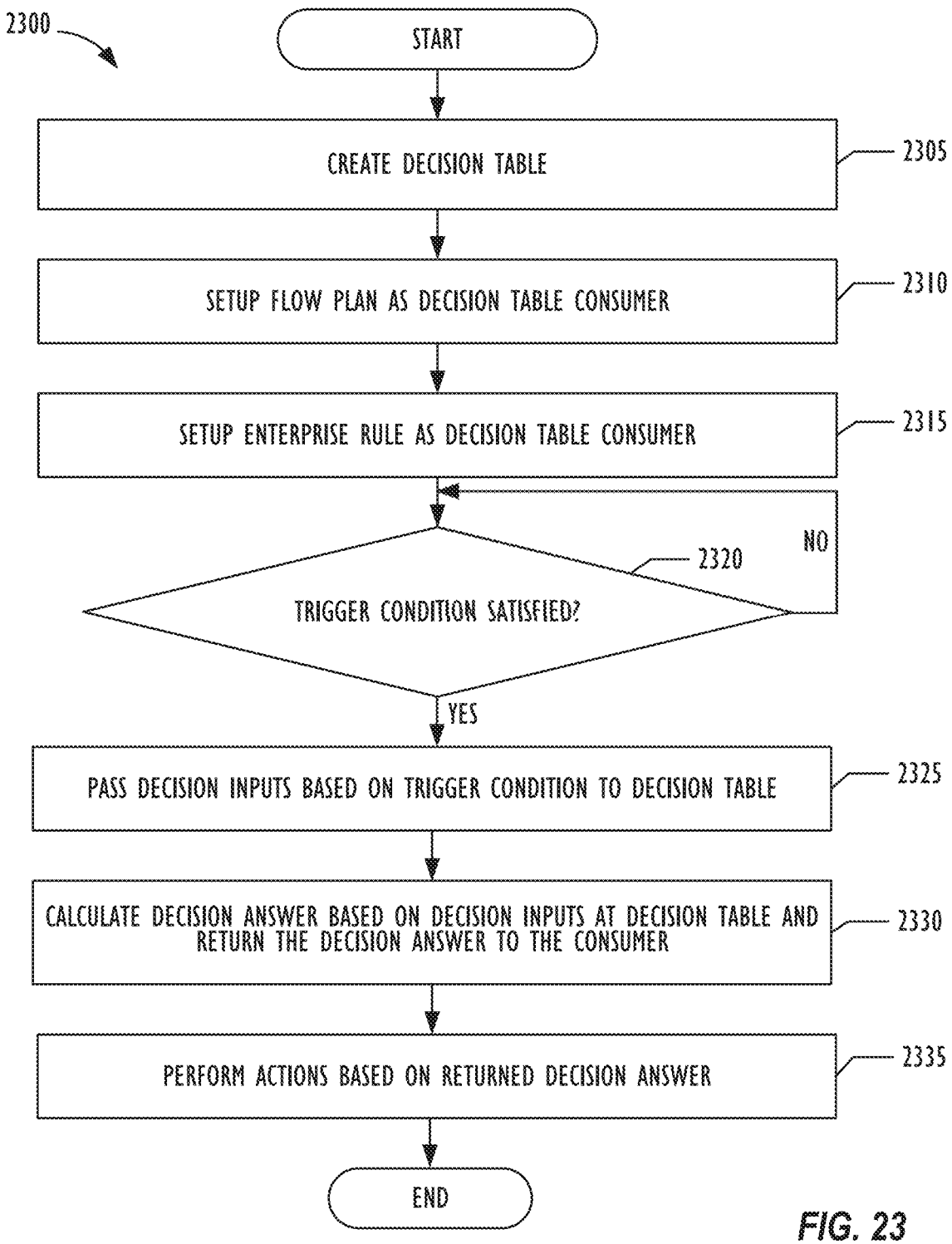
FIG. 23 is a flowchart of another embodiment of a method that creates and executes a decision table and a flow plan or an enterprise rule that consumes a decision table.

FIG. 23 is a flowchart of an embodiment of method 2300 that creates and executes a decision table, and a consumer of the decision table. Method 2300 may create and execute decision tables, and consumers thereof (e.g., enterprise rules, flow plans, and the like) using hardware, software, or both. Using FIG. 3 as an example, method 2300 may be implemented using decision table module 320, enterprise rule engine 340, and/or flow plan development platform 370. In one embodiment, method 2300 may be implemented on client instance 315. In another embodiment, method 2300 may be implemented on different components, some of which are located on client instance 315 and others located on another remote computing system, such as MID server 107 of FIG. 1. Although FIG. 23 illustrates that the blocks of method 2300 are implemented in a sequential operation, other embodiments of method 2300 may have two or more blocks implemented in parallel operations. In still other embodiments, operation of one or more blocks may be omitted or one or more additional operations of one or more additional blocks may be added.

Method 2300 may start at block 2305 to create a decision table. As discussed in FIGS. 3-9, decision table user interface 325 allows a user to create a decision table, and specify corresponding decision inputs, associated plurality of decision answers returnable by the decision table, and corresponding condition logic for each decision answer. Recall that the user (e.g., enterprise decision maker with policy knowledge) may independently create, manage, and modify the decision table and corresponding decision inputs, decision answers, and condition logic, via decision table user interface 325, without process owners having to re-author consumers (e.g., enterprise rule, flow plan, and the like) that consume the decision table to take actions based on returned decision answers. Also recall that the decision answer returnable by the decision table can be a hardcoded direct answer (e.g., textual string, alphanumeric value, and the like) or it can be a reference (e.g., pointer or path) to an application object (e.g., record in a table, workflow, template, case, project, record object, or other script and/or associated metadata) in any other part of the aPaaS platform 310. For example, the plurality of decision answers can be paths that respectively reference a series of workflows, a series of records in a table, a series of templates, or a series of any other rich objects in another part of the aPaaS platform 310 and associated metadata. The returned decision answer can thus act to link the triggering record to another record or object in the aPaaS platform and associated metadata.

Method 2300 may then move to block 2310 to create a design-time flow plan using one or more user interfaces. As discussed in FIGS. 13 and 16, the user interfaces allow a user to create a design-time flow plan that consumes a decision table (e.g., the table created at block 2305) and drive a data model that represents the design-time flow plan. Method 2300 may then move to block 2315 to create an enterprise rule (e.g., enterprise logic, script includes, scheduled job, and the like). As shown in FIGS. 3 and 10-11, enterprise rule creation user interface 345 allows a user to create an enterprise rule that consumes a decision table (e.g., the table created at block 2305) and drive a data model that represents the enterprise rule. At block 2320, enterprise rule engine 340 and/or flow plan development platform 370 may determine whether a trigger condition (e.g., trigger element) of the consumer (e.g., enterprise rule, flow plan, and the like) is satisfied. As described previously, the trigger condition predefined by the consumer may correspond to a CRUD operation for a record in a selected table, a timer, a REST API call, and the like. If the trigger condition is not satisfied (NO at block 2320) the method 2300 stands-by to wait for the trigger and no further operations are performed. Recall that since worker threads to support execution of actions are assigned at execution time by inserting scheduled jobs, waiting at block 2320 for the trigger condition to be satisfied does not preempt worker threads from executing other transactions while the trigger condition is unmet. This minimizes performance impact and disruption when executing trigger based consumers like enterprise rules and flow plans.

If, on the other hand, it is determined that the trigger condition of the consumer is satisfied (YES at block 2320), method 2300 proceeds to block 2325 where enterprise rule engine 340 and/or flow plan development platform 370 conduct necessary run-time operations to execute the flow plan and/or enterprise rule. Specifically, enterprise rule engine 340 and/or flow plan development platform 370 may pass the necessary values for decision inputs corresponding to the consumed decision table to decision table API 335 along with the decision table's ID for calculation and return of a decision answer. The passed values for the decision inputs may be from one or more fields (columns or attributes) of the record that triggered the consumer. Alternately, or in addition, the passed values may be values of other attributes that are associated with the trigger condition (e.g., time, location, temperature, humidity, and the like).

Method 2300 then proceeds to block 2330 where decision table module 320 calculates a decision answer based on input values for the decision inputs received from the consumer through decision table API 335. Decision table module 320 applies the condition logic of the decision table called by the decision table API 335 based on the input values for the decision inputs to the decision table, and serves-up one of the plurality of decision answers associated with the decision table based on the condition logic that resolves to be true for the given input values. Decision table module 320 then passes the calculated decision answer to the calling consumer via decision table API 335. Method 2300 then proceeds to block 2335 where enterprise rule engine 340 and/or flow plan development platform 370 perform one or more actions (e.g., decision answer action elements) corresponding to the returned decision answer. For example, if the returned decision answer is a reference to an application object (e.g., flow object, case object, project object, template object, record object, and the like) in the aPaaS platform, enterprise rule engine 340 and/or flow plan development platform 370 may set the field value of a predetermined field of the record that triggered the trigger condition at block 2320 with the reference path. As another example, enterprise rule engine 340 and/or flow plan development platform 370 may perform one or more action elements defined in the enterprise rule or design-time flow plan as corresponding to the returned decision answer (e.g., action elements corresponding to a particular decision flow path of the flow plan).

Figure 24:
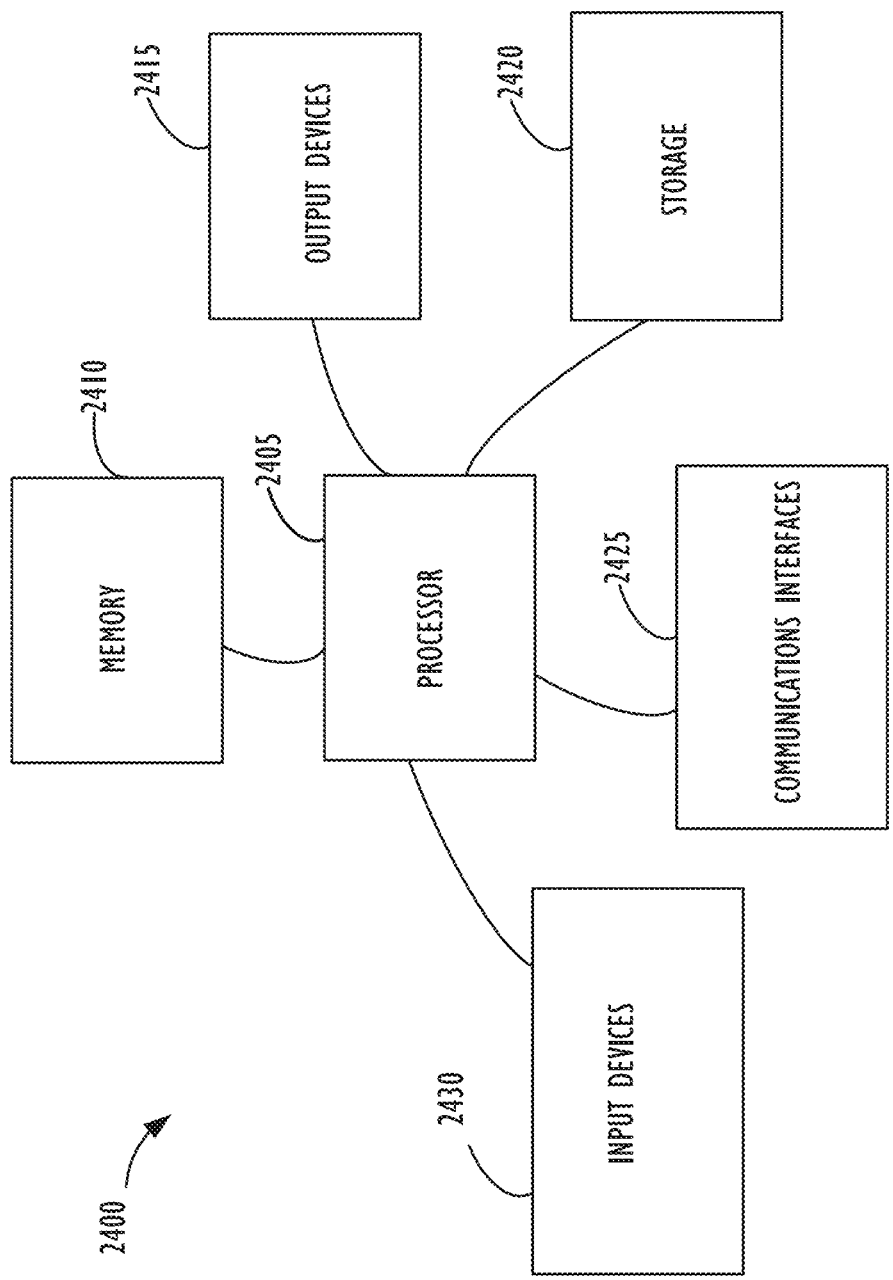
FIG. 24 illustrates a block diagram of a computing system for use with implementing one or more of the disclosed embodiments.

FIG. 24 illustrates a high-level block diagram 2400 of a processing device (computing system) that may be used to implement one or more disclosed embodiments (e.g., cloud resources platform/network 110, client devices 104A-104E, remote client device 305, client instance 315, aPaaS platform 310, flow designer system 1302, etc.). For example, computing device 2400 illustrated in FIG. 24 could represent a client device or a physical server device and include either hardware or virtual processor(s) depending on the level of abstraction of the computing device. In some instances (without abstraction) computing device 2400 and its elements as shown in FIG. 24 each relate to physical hardware and in some instances one, more, or all of the elements could be implemented using emulators or virtual machines as levels of abstraction. In any case, no matter how many levels of abstraction away from the physical hardware, computing device 2400 at its lowest level may be implemented on physical hardware. As also shown in FIG. 24, computing device 2400 may include one or more input devices 2430, such as a keyboard, mouse, touchpad, or sensor readout (e.g., biometric scanner) and one or more output devices 2415, such as displays, speakers for audio, or printers. Some devices may be configured as input/output devices also (e.g., a network interface or touchscreen display). Computing device 2400 may also include communications interfaces 2425, such as a network communication unit that could include a wired communication component and/or a wireless communications component, which may be communicatively coupled to processor 2405. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 24, processing device 2400 includes a processing element such as processor 2405 that contains one or more hardware processors, where each hardware processor may have a single or multiple processor cores. In one embodiment, the processor 2405 may include at least one shared cache that stores data (e.g., computing instructions) that are utilized by one or more other components of processor 2405. For example, the shared cache may be a locally cached data stored in a memory for faster access by components of the processing elements that make up processor 2405. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 24, the processing elements that make up processor 2405 may also include one or more other types of hardware processing components, such as graphics processing units (GPUs), application specific integrated circuits (ASICs), field-programmable gate arrays (FPGAs), and/or digital signal processors (DSPs).

FIG. 24 illustrates that memory 2410 may be operatively and communicatively coupled to processor 2405. Memory 2410 may be a non-transitory medium configured to store various types of data. For example, memory 2410 may include one or more volatile devices such as random access memory (RAM). Non-volatile storage devices 2420 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 2420 may be used to store overflow data if allocated RAM is not large enough to hold all working data. The non-volatile storage devices 2420 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 2405. In one embodiment, the compiling process of the software program may transform program code written in a programming language to another computer language such that the processor 2405 is able to execute the programming code. For example, the compiling process of the software program may generate an executable program that provides encoded instructions (e.g., machine code instructions) for processor 2405 to accomplish specific, non-generic, particular computing functions.

After the compiling process, the encoded instructions may then be loaded as computer executable instructions or process steps to processor 2405 from storage 2420, from memory 2410, and/or embedded within processor 2405 (e.g., via a cache or on-board ROM). Processor 2405 may be configured to execute the stored instructions or process steps in order to perform instructions or process steps to transform the computing device into a non-generic, particular, specially programmed machine or apparatus. Stored data, e.g., data stored by a storage device 2420, may be accessed by processor 2405 during the execution of computer executable instructions or process steps to instruct one or more components within computing system 2400.

A user interface (e.g., output devices 2415 and input devices 2430) can include a display, positional input device (such as a mouse, touchpad, touchscreen, or the like), keyboard, or other forms of user input and output devices. The user interface components may be communicatively coupled to processor 2405. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing system 2400 may comprise other components well known in the art, such as sensors, powers sources, and/or analog-to-digital converters, not explicitly shown in FIG. 24.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:
   non-transitory memory; and
   one or more hardware processors configured to read instructions from the non-transitory memory to cause the one or more hardware processors to:
   set a trigger element of a design-time flow plan so that the trigger element activates in response to one or more predetermined computing conditions being satisfied;
   set a plurality of action elements of the design-time flow plan, wherein at least one of the plurality of action elements is a decision action element implemented by a decision table that includes decision inputs and respective condition logic based on the decision inputs for each of a plurality of decision answers associated with the decision table, wherein the decision table is external to and decoupled from the design-time flow plan;
   define a first one of the plurality of action elements of the design-time flow plan as a first decision answer action element that is executed when a decision answer served-up by the decision table corresponds to a first decision answer path in the design-time flow plan that is associated with a first one of the plurality of decision answers;
   publish the design-time flow plan;
   in response to the trigger element being activated, convert the published design-time flow plan into a run-time flow plan;
   execute, within the run-time flow plan, one or more operations associated with the decision action element by passing values for the decision inputs to the decision table based on the activated trigger element;
   in response to none of the respective condition logic of the plurality of decision answers associated with the decision table being satisfied based on the passed values to the decision table, execute, within the run-time flow plan, one or more operations associated with a default decision answer path in the published design-time flow plan; and
   update the respective condition logic corresponding to at least one of the plurality of decision answers associated with the decision table, wherein the one or more operations associated with the decision action element are executed within the run-time flow plan to receive one of the plurality of decision answers from the decision table based on the updated condition logic of the decision table, without re-publishing the design-time flow plan.

2. The system according to claim 1, wherein the one or more hardware processors are configured to read instructions from the non-transitory memory to cause the one or more hardware processors to:
   receive, from the decision table, one of the plurality of decision answers served-up based on the passed values for the decision inputs and the respective condition logic;
   execute, within the run-time flow plan, one or more operations associated with the first decision answer action element when the served-up decision answer is associated with the first decision answer path in the design-time flow plan; and
   execute, within the run-time flow plan, one or more operations associated with a second decision answer action element when the served-up decision answer is associated with a second decision answer path in the design-time flow plan.

3. The system according to claim 2, wherein the one or more operations associated with each of the first and second decision answer action elements include at least one of an operation with an external application, an operation with an internal application, and an operation to update a field value of a record in a table, wherein the record is associated with the activated trigger element.

4. The system according to claim 1, wherein the respective condition logic is updated by one of changing a number of the decision inputs associated with the decision table, and updating or adding one or more values of one or more of the decision inputs to arrive at a particular decision answer.

5. The system according to claim 2, wherein the values passed for the decision inputs to the decision table include values of predetermined fields of a record that activated the trigger element.

6. The system according to claim 1, wherein the one or more hardware processors are configured to read instructions from the non-transitory memory to cause the one or more hardware processors to:
update the decision table by adding new condition logic corresponding to a new decision answer associated with the decision table, wherein the new decision answer is distinct from the plurality of decision answers;
update the design-time flow plan by defining a second one of the plurality of action elements of the design-time flow plan as a second decision answer action element that is executed at run-time when the decision answer served up by the updated decision table corresponds to a second decision answer path in the design-time flow plan that is associated with the new decision answer; and re-publish the updated design-time flow plan.

7. The system according to claim 1, wherein the trigger element comprises a decision trigger element that is implemented by another decision table having a plurality of decision answers respectively corresponding to a plurality of flow objects, each of the plurality of flow objects being a reference to a corresponding design-time flow plan.

8. The system according to claim 1, wherein the one or more predetermined computing conditions of the trigger element in the design-time flow plan include one of a create, read, update, or delete operation for a record matching a filter condition, expiration of a timer, and arrival of an inbound Representational State Transfer Application Programming Interface (REST API) call.

9. A method comprising:
setting a trigger element of a design-time flow plan so that the trigger element activates in response to one or more predetermined computing conditions being satisfied;
setting a plurality of action elements of the design-time flow plan, wherein at least one of the plurality of action elements is a decision action element implemented by a decision table that includes decision inputs and respective condition logic based on the decision inputs for each of a plurality of decision answers associated with the decision table, wherein the decision table is external to and decoupled from the design-time flow plan;
defining a first one of the plurality of action elements of the design-time flow plan as a first decision answer action element that is executed when a decision answer served-up by the decision table corresponds to a first decision answer path in the design-time flow plan that is associated with a first one of the plurality of decision answers;
publishing the design-time flow plan;
in response to the trigger element being activated, converting the published design-time flow plan into a run-time flow plan;
executing, within the run-time flow plan, one or more operations associated with the decision action element by passing values for the decision inputs to the decision table based on the activated trigger element;
in response to none of the respective condition logic of the plurality of decision answers associated with the decision table being satisfied based on the passed values to the decision table, executing, within the run-time flow plan, one or more operations associated with a default decision answer path in the published design-time flow plan; and
updating the respective condition logic corresponding to at least one of the plurality of decision answers associated with the decision table, wherein the one or more operations associated with the decision action element are executed within the run-time flow plan to receive one of the plurality of decision answers from the decision table based on the updated condition logic of the decision table, without re-publishing the design-time flow plan.

10. The method according to claim 9, comprising:
receiving from the decision table one of the plurality of decision answers served-up based on the passed values for the decision inputs and the respective condition logic;
executing, within the run-time flow plan, one or more operations associated with the first decision answer action element when the served-up decision answer is associated with the first decision answer path in the design-time flow plan; and
executing, within the run-time flow plan, one or more operations associated with a second decision answer action element when the served-up decision answer is associated with a second decision answer path in the design-time flow plan.

11. The method according to claim 10, wherein the one or more operations associated with each of the first and second decision answer action elements include at least one of an operation with an external application, an operation with an internal application, and an operation to update a field value of a record in a table, wherein the record is associated with the activated trigger element.

12. The method according to claim 9, wherein the respective condition logic is updated by one of changing a number of the decision inputs associated with the decision table, and updating or adding one or more values of one or more of the decision inputs to arrive at a particular decision answer.

13. The method according to claim 10, wherein the values passed for the decision inputs to the decision table include values of predetermined fields of a record that activated the trigger element.

14. The method according to claim 9, comprising:
updating the decision table by adding new condition logic corresponding to a new decision answer associated with the decision table, wherein the new decision answer is distinct from the plurality of decision answers;
updating the design-time flow plan by defining a second one of the plurality of action elements of the design-time flow plan as a second decision answer action element that is executed at run-time when the decision answer served up by the updated decision table corresponds to a second decision answer path in the design-time flow plan that is associated with the new decision answer; and
re-publishing the updated design-time flow plan.

15. A non-transitory computer-readable recording medium having stored thereon a program, the program comprising instructions that, when executed by one or more hardware processors, cause the one or more hardware processors to:
set a trigger element of a design-time flow plan so that the trigger element activates in response to one or more predetermined computing conditions being satisfied;

set a plurality of action elements of the design-time flow plan, wherein at least one of the plurality of action elements is a decision action element implemented by a decision table that includes decision inputs and respective condition logic based on the decision inputs for each of a plurality of decision answers associated with the decision table, wherein the decision table is external to and decoupled from the design-time flow plan;

define a first one of the plurality of action elements of the design-time flow plan as a first decision answer action element that is executed when a decision answer served-up by the decision table corresponds to a first decision answer path in the design-time flow plan that is associated with a first one of the plurality of decision answers;

publish the design-time flow plan;

in response to the trigger element being activated, convert the published design-time flow plan into a run-time flow plan;

execute, within the run-time flow plan, one or more operations associated with the decision action element by passing values for the decision inputs to the decision table based on the activated trigger element; and in response to none of the respective condition logic of the plurality of decision answers associated with the decision table being satisfied based on the passed values to the decision table, execute, within the run-time flow plan, one or more operations associated with a default decision answer path in the published design-time flow plan; and update the respective condition logic corresponding to at least one of the plurality of decision answers associated with the decision table, wherein the one or more operations associated with the decision action element are executed within the run-time flow plan to receive one of the plurality of decision answers from the decision table based on the updated condition logic of the decision table, without re-publishing the design-time flow plan.

16. The non-transitory computer-readable recording medium according to claim 15, comprising instructions that, when executed by one or more hardware processors, cause the one or more hardware processors to:

receive from the decision table one of the plurality of decision answers served-up based on the passed values for the decision inputs and the respective condition logic;

execute, within the run-time flow plan, one or more operations associated with the first decision answer action element when the served-up decision answer is associated with the first decision answer path in the design-time flow plan; and execute, within the run-time flow plan, one or more operations associated with a second decision answer action element when the served-up decision answer is associated with a second decision answer path in the design-time flow plan.

17. The system according to claim 1, wherein the one or more hardware processors are configured to cause a flow engine to execute the run-time flow plan, wherein the flow engine comprises an operation ready determination engine configured to determine whether a particular operation of the run-time flow plan is ready to run, wherein the particular operation is ready to run when input values of the particular operation are ready and when the flow engine has completed any predecessor operations corresponding to the particular operation.

18. The system according to claim 17, wherein the flow engine comprises an input/output value manager that reports, to the operation ready determination engine, an indication of whether the particular operation of the run-time flow plan is ready to run.

* * * * *